US012741405B2

(12) United States Patent
Ohmori et al.

(10) Patent No.: US 12,741,405 B2
(45) Date of Patent: Sep. 22, 2026

(54) MOTOR CORE MANUFACTURING DEVICE AND MOTOR CORE MANUFACTURING METHOD

(71) Applicant: NHK SPRING CO., LTD., Yokohama (JP)

(72) Inventors: Makoto Ohmori, Yokohama (JP); Kei Sato, Yokohama (JP); Takumi Furuya, Yokohama (JP); Jun Kinoshita, Yokohama (JP); Asuka Kawasaki, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 60 days.

(21) Appl. No.: 18/852,248

(22) PCT Filed: Mar. 31, 2023

(86) PCT No.: PCT/JP2023/013619
§ 371 (c)(1),
(2) Date: Sep. 27, 2024

(87) PCT Pub. No.: WO2023/191075
PCT Pub. Date: Oct. 5, 2023

(65) Prior Publication Data

US 2025/0205946 A1 Jun. 26, 2025

(30) Foreign Application Priority Data

Mar. 31, 2022 (JP) ................................ 2022-060560

(51) Int. Cl.
*B29C 45/02* (2006.01)
*B29C 45/04* (2006.01)
(Continued)

(52) U.S. Cl.
CPC .... *B29C 45/14639* (2013.01); *B29C 45/0441* (2013.01); *B29C 45/045* (2013.01);
(Continued)

(58) Field of Classification Search
CPC ..... B29C 45/02; B29C 45/04; B29C 45/0441; B29C 45/045; B29C 45/14598;
(Continued)

(56) References Cited

U.S. PATENT DOCUMENTS

2016/0065040 A1 3/2016 Nagai et al.
2018/0056562 A1 3/2018 Kori
(Continued)

FOREIGN PATENT DOCUMENTS

JP A 2009-065732 3/2009
JP A 2009-268306 11/2009
(Continued)

OTHER PUBLICATIONS

Translation of JP 2021087296 A (published on Jun. 3, 2021).*
(Continued)

*Primary Examiner* — Leo B Tentoni
(74) *Attorney, Agent, or Firm* — Knobbe, Martens, Olson & Bear, LLP

(57) ABSTRACT

A motor core manufacturing device includes: a mold that holds a motor core including a resin filling portion; a chamber communicating with a resin composition filling path, wherein the resin composition filling path is formed in the mold and has one end portion communicating with the resin filling portion; a plunger that conveys a resin composition conveyed to the chamber toward the resin composition filling path; a first heater that is disposed in the mold, or in the mold and around the chamber; and an extruding machine that conveys the resin composition while kneading the resin
(Continued)

composition toward the chamber in order to put a previously measured amount of the resin composition into the chamber.

9 Claims, 15 Drawing Sheets

(51) Int. Cl.

| | |
|---|---|
| ***B29C 45/14*** | (2006.01) |
| ***B29C 45/47*** | (2006.01) |
| ***B29C 45/53*** | (2006.01) |
| ***B29C 45/54*** | (2006.01) |
| ***B29C 45/72*** | (2006.01) |
| ***B29C 45/73*** | (2006.01) |
| ***H02K 15/02*** | (2025.01) |
| ***H02K 15/035*** | (2025.01) |
| *B29K 705/12* | (2006.01) |
| *B29L 31/00* | (2006.01) |

(52) U.S. Cl.
CPC ...... *B29C 45/14598* (2013.01); *B29C 45/542* (2013.01); *B29C 2045/14877* (2013.01); *B29K 2705/12* (2013.01); *B29K 2995/0008* (2013.01); *B29L 2031/749* (2013.01); *B29L 2031/7498* (2013.01)

(58) Field of Classification Search
CPC .... B29C 45/14639; B29C 2045/14877; B29C 45/47; B29C 45/53; B29C 45/542; B29C 45/72; B29C 45/73; B29K 2705/12; B29K 2995/0008; B29L 2031/749; B29L 2031/7498; H02K 15/02; H02K 15/035
USPC ... 264/259, 265, 272.2, 297.2, 297.3, 297.6, 264/297.7, 328.14, 328.16, 328.19, 349; 425/110, 127, 129.1, 547, 548, 550, 557, 425/561, 575, 576, 585, 587, 543; 29/527.1, 527.3, 598
See application file for complete search history.

(56) References Cited

U.S. PATENT DOCUMENTS

| | | | | |
|---|---|---|---|---|
| 2020/0099278 A1 | | 3/2020 | Fukuyama et al. | |
| 2020/0164556 A1 | * | 5/2020 | Kirsch | B29C 45/0441 |
| 2021/0234440 A1 | | 7/2021 | Murayama et al. | |
| 2022/0140708 A1 | | 5/2022 | Hiramatsu et al. | |

FOREIGN PATENT DOCUMENTS

| | | | | |
|---|---|---|---|---|
| JP | A 2012-223024 | | 11/2012 | |
| JP | A 2013-009453 | | 1/2013 | |
| JP | A 2016-048982 | | 4/2016 | |
| JP | 2021087296 A | * | 6/2021 | H02K 15/02 |
| JP | A 2021-087297 | | 6/2021 | |
| JP | A 2021-164214 | | 10/2021 | |
| JP | 2022-007589 A | | 1/2022 | |
| WO | WO 2017/179547 A1 | | 10/2017 | |
| WO | WO 2019/180780 A1 | | 9/2019 | |
| WO | WO 2020/075323 A1 | | 4/2020 | |
| WO | WO 2020/196768 A1 | | 10/2020 | |

OTHER PUBLICATIONS

Extended Search Report in European Application No. 23781083.3 dated Jun. 16, 2025, in 9 pages.
International Search Report issued in International Application No. PCT/JP2023/013619, mailed on Jun. 20, 2023.

* cited by examiner

FIG.4

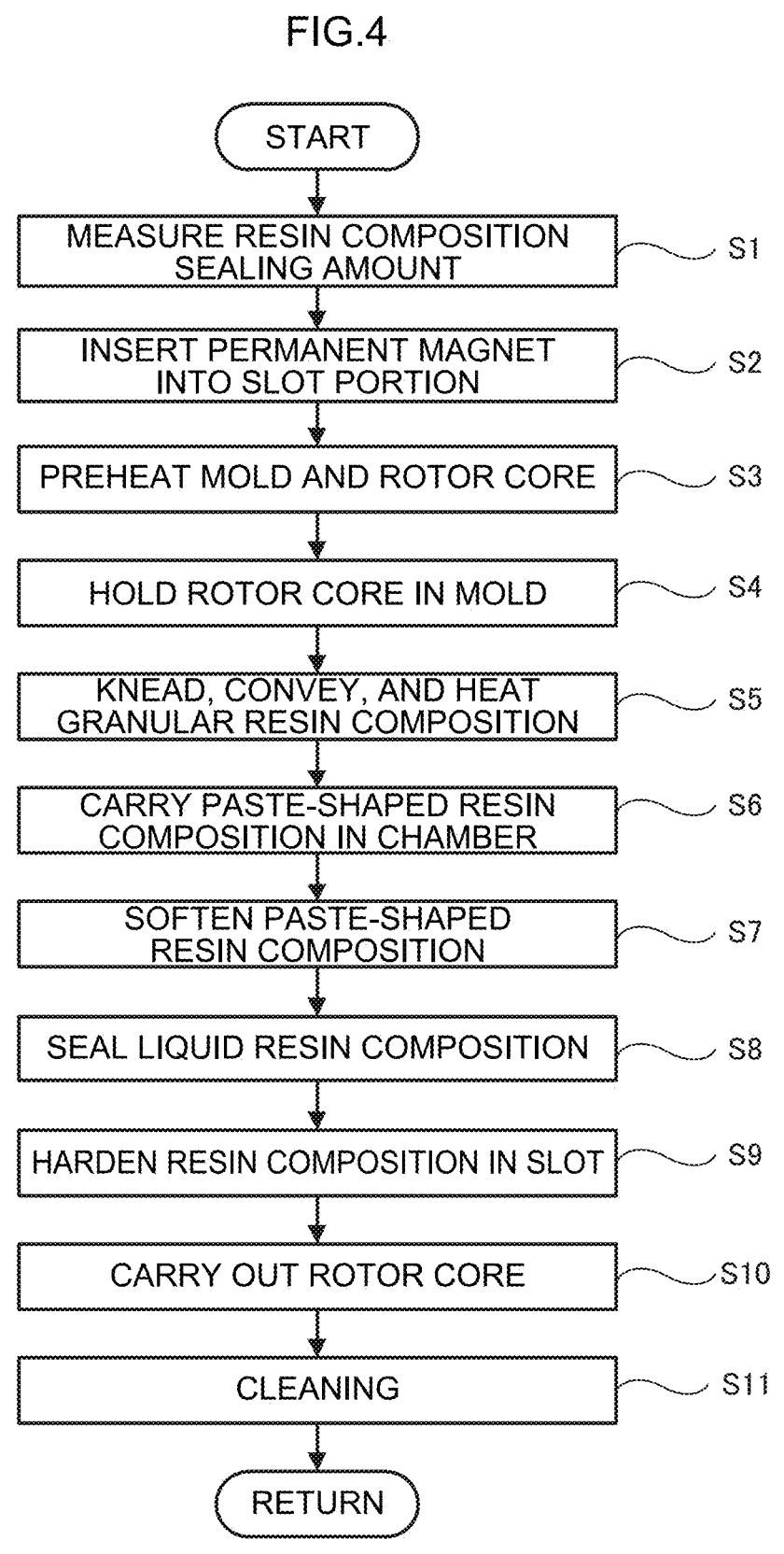

START

MEASURE RESIN COMPOSITION SEALING AMOUNT — S1

INSERT PERMANENT MAGNET INTO SLOT PORTION — S2

PREHEAT MOLD AND ROTOR CORE — S3

HOLD ROTOR CORE IN MOLD — S4

KNEAD, CONVEY, AND HEAT GRANULAR RESIN COMPOSITION — S5

CARRY PASTE-SHAPED RESIN COMPOSITION IN CHAMBER — S6

SOFTEN PASTE-SHAPED RESIN COMPOSITION — S7

SEAL LIQUID RESIN COMPOSITION — S8

HARDEN RESIN COMPOSITION IN SLOT — S9

CARRY OUT ROTOR CORE — S10

CLEANING — S11

RETURN

MOTOR CORE MANUFACTURING DEVICE AND MOTOR CORE MANUFACTURING METHOD

TECHNICAL FIELD

The present disclosure relates to a motor core manufacturing device and a motor core manufacturing method.

BACKGROUND ART

In some rotary electric machines, a permanent magnet is attached to a motor core, for example, a rotor core. As described above, when the permanent magnet is attached to the motor core, a method is known in which the permanent magnet is inserted into a slot provided in the motor core, and then a resin composition is filled and hardened around the permanent magnet (see, for example, Japanese Patent Application Laid-Open (JP-A) No. 2013-009453).

JP-A No. 2013 009453 discloses that when the resin composition is filled into the slot of the rotor core, a resin tablet having a predetermined size molded in advance is put into a pot and heated in the pot to be softened and melted before filling.

SUMMARY OF INVENTION

Technical Problem

In a device described in JP-A No. 2013 009453, it is usual to prepare a larger amount of resin than a prescribed filling amount in consideration of a dimensional tolerance of a product or the like so that the resin filled into the slot is not insufficient. However, when the dimensional tolerance is small, waste of the resin increases. Since various shapes are adopted for the motor core, and a shape of the slot into which the magnet is inserted can also take various shapes, the slot shapes are rarely the same shapes in different vehicle types. Therefore, in order to prepare a resin tablet having an optimum size for each motor core, it is necessary to secure a storage space and the like, and the management cost increases. There is also a problem that management of various resin tablets becomes complicated, for example.

In view of the above-described problems, an object of the disclosure is to provide a motor core manufacturing device and a motor core manufacturing method capable of suppressing loss of a resin composition.

Solution to Problem

In order to achieve the above object, a motor core manufacturing device according to a first aspect of the disclosure includes: a mold that holds a motor core, the motor core including a resin filling portion; a chamber that communicates with a resin composition filling path, wherein the resin composition filling path is formed in the mold and one end portion of the resin composition filling path communicates with the resin filling portion; a plunger that conveys a resin composition conveyed to the chamber toward the resin composition filling path; a first heater that is disposed in the mold, or in the mold and around the chamber; and an extruding machine that conveys the resin composition while kneading the resin composition toward the chamber in order to put a previously measured amount of the resin composition into the chamber.

In the motor core manufacturing device described above, since a tablet-shaped resin composition molded in advance is not used as the resin composition to be put into the chamber, loss of the resin composition can be suppressed, and control of a supply amount can be easily changed.

According to a motor core manufacturing device according to a second aspect of the disclosure, in the motor core manufacturing device according to the first aspect of the disclosure, the extruding machine includes an extrusion conveyance path that conveys the resin composition, and a second heater that is disposed around the extrusion conveyance path and heats the resin composition conveyed in the extrusion conveyance path.

In the motor core manufacturing device described above, by heating the resin composition before being put into the chamber, specifically, a powdery or paste-shaped resin composition, a time required for softening in the chamber can be shortened or omitted, and production efficiency can be improved. It is possible to uniformly heat the resin composition in the chamber.

According to a motor core manufacturing device according to a third aspect of the disclosure, in the motor core manufacturing device according to the second aspect of the disclosure, the second heater heats the resin composition conveyed in the extrusion conveyance path to from 70 to 100° C.

In the motor core manufacturing device described above, since the structure in which the resin composition is conveyed toward the chamber using the extruding machine is adopted, it is possible to perform preheating at a high temperature that is conventionally difficult to perform due to deterioration in conveyance performance caused by softening of the resin composition.

According to a motor core manufacturing device according to a fourth aspect of the disclosure, in the motor core manufacturing device according to any one of the first to third aspects of the disclosure, the extruding machine includes a screw that is disposed in an extrusion conveyance path for conveying the resin composition and conveys the resin composition while kneading the resin composition.

In the motor core manufacturing device described above, since the resin composition is conveyed using the screw, the amount of the resin composition to be put into the chamber can be relatively simply adjusted. The resin composition to be supplied to the extruding machine, for example, a powdery resin composition is kneaded with the screw to be formed into a paste form, so that the resin composition is easily conveyed.

According to a motor core manufacturing device according to a fifth aspect of the disclosure, in the motor core manufacturing device according to any one of the first to fourth aspects of the disclosure, the mold includes an upper mold that supports an upper portion of the motor core and a lower mold that supports a lower portion of the motor core, and the lower mold includes a plurality of stages on which the resin composition filling path is formed and a transfer unit that disposes one of the plurality of stages at a position facing the upper mold.

In the motor core manufacturing device described above, since the motor core can be manufactured while the stage is replaced, production efficiency can be improved.

A motor core manufacturing method according to a sixth aspect of the disclosure includes: a step of measuring a filling amount of a resin composition filled into a resin filling portion of a motor core; a step of holding the motor core in a mold in which a resin composition filling path is formed such that the resin composition filling path and the resin filling portion communicate with each other; a step of conveying the measured resin composition filling amount of the resin composition toward a chamber communicating with the resin composition filling path by using an extruding machine capable of conveying the resin composition; a step of operating a plunger movable in the chamber to fill the resin filling portion with the softened resin composition in the chamber; and a step of hardening the softened resin composition filled into the resin filling portion.

In the motor core manufacturing method described above, since a tablet-shaped resin composition molded in advance is not used as the resin composition to be put into the chamber, loss of the resin composition can be suppressed, and a supply amount to the chamber can be easily changed.

According to a motor core manufacturing method according to a seventh aspect of the disclosure, in the motor core manufacturing method according to the sixth aspect of the disclosure, the motor core includes a rotor core, the resin filling portion includes one or a plurality of slot portions formed along an axial direction of the rotor core into which a permanent magnet is insertable, and the motor core manufacturing method further includes a step of inserting the permanent magnet into the slot portion of the rotor core.

In the motor core manufacturing method described above, the permanent magnet can be attached to the rotor core with a good yield.

According to a motor core manufacturing method according to an eighth aspect of the disclosure, in the motor core manufacturing method according to the sixth or seventh aspect of the disclosure, the motor core manufacturing method further includes a step of heating the resin composition conveyed in the extruding machine.

In the motor core manufacturing method described above, by preheating the resin composition before being put into the chamber, a time required for softening in the chamber can be shortened or omitted, and production efficiency can be improved. Since heating is performed in the extruding machine, uniform preheating can be performed.

According to a motor core manufacturing method according to a ninth aspect of the disclosure, in the motor core manufacturing method according to any one of the sixth to eighth aspects of the disclosure, the motor core manufacturing method further includes a step of preheating at least one of the mold or the motor core.

In the motor core manufacturing method described above, the resin composition can be hardened in a short time by preheating the mold and the rotor core that are filled with the resin composition or through which the resin composition passes.

Advantageous Effects of Invention

According to a motor core manufacturing device and a motor core manufacturing method of the disclosure, loss of a resin composition can be suppressed.

BRIEF DESCRIPTION OF DRAWINGS

FIG. 4 is a flowchart illustrating an example of a motor core manufacturing method according to the first embodiment of the disclosure.

DESCRIPTION OF EMBODIMENTS

Figure 1:
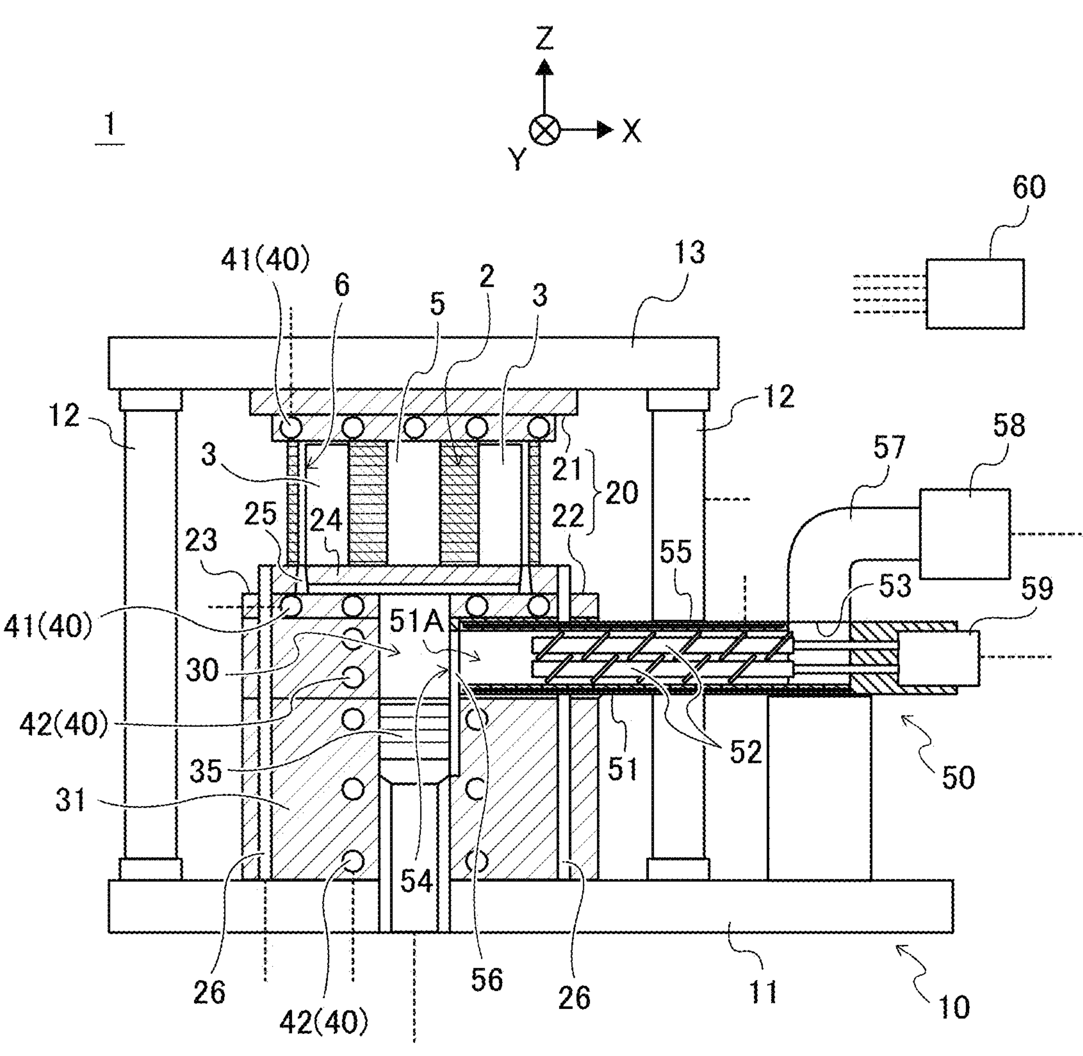
FIG. 1 is a schematic explanatory view illustrating an example of a motor core manufacturing device according to a first embodiment of the disclosure.

The application is based on Japanese Patent Application No. 2022-060560 filed on Mar. 31, 2022 in Japan, the contents of which form a part of the contents of this application.

The disclosure will also be more fully understood by the following detailed description. A further application range of the present application will be apparent from the following detailed description. However, the detailed description and the specific examples are preferred embodiments of the disclosure and are described for purposes of explanation only. From the detailed description, various changes and modifications will be apparent to those skilled in the art within the spirit and scope of the disclosure.

The applicant does not intend to present any of the described embodiments to the public, and among the disclosed modifications and alternatives, modifications and alternatives that may not be included in the scope of the claims are also included in the invention under the doctrine of equivalents.

Hereinafter, embodiments for carrying out the disclosure will be described with reference to the drawings. In the following, a range necessary for description for achieving the object of the disclosure will be schematically illustrated, a range necessary for description of a corresponding portion of the disclosure will be mainly described, and portions for which description is omitted will be based on known technologies. Members that are the same as or correspond to each other in the drawings are denoted by the same or similar reference numerals, and redundant description is omitted. In a case in which a plurality of members that are the same as or correspond to each other are included in one drawing, only some of the members may be denoted by reference numerals for easy understanding of the drawing.

First Embodiment

<Motor Core Manufacturing Device>

FIG. 1 is a schematic explanatory view illustrating an example of a motor core manufacturing device according to a first embodiment of the disclosure. A motor core manufacturing device 1 according to the present embodiment may be a device for attaching a permanent magnet 3 to a motor core, for example, an inner rotor type rotor core 2. In addition, attachment of the permanent magnet 3 may be realized by resin molding using a resin composition P. In the present embodiment, the rotor core 2 is exemplified as a motor core, and a slot portion 4 (more strictly, a filling space 6) of the rotor core 2 is exemplified as a resin filling portion of the motor core, but the disclosure is not limited thereto. Specifically, the motor core manufacturing device 1 can also be used, for example, for resin-molding a portion of a stator core as the motor core around which a coil is wound, or for filling a through hole or the like provided in an axial direction of a laminated core without caulking with a resin to integrally fix the laminated core. In the following description, in order to facilitate the understanding, an X direction illustrated in FIG. 1 (or FIG. 3) may be described as a left-right direction, a Y direction may be described as a front-rear direction, and a Z direction may be described as a height direction (or an up-down direction).

The resin composition P used in the motor core manufacturing device 1 according to the present embodiment may mainly contain a thermosetting resin such as an epoxy resin, a phenol resin, an unsaturated polyester resin, or a cyanate resin. A hardener, a filler, and the like may be added to the resin composition P in addition to the thermosetting resin.

As illustrated in FIG. 1, the motor core manufacturing device 1 according to the present embodiment includes at least a manufacturing device main body 10, a mold 20 for holding the rotor core 2, a chamber 30 capable of accommodating the resin composition P, a plunger 35 for conveying the resin composition P in the chamber 30, a first heater 40 capable of heating the mold 20 and the chamber 30, and an extruding machine 50 for carrying a previously measured amount of the resin composition P into the chamber 30.

The manufacturing device main body 10 may include a base 11, a plurality of (for example, four) pillars 12 erected on a surface of the base 11, and a top plate 13 supported by tip portions of the pillars 12. An upper mold 21 of the mold 20 to be described later may be fixed to a bottom surface of the top plate 13, and the top plate 13 may be movable in the up-down direction together with the pillar 12 and the upper mold 21 by using an actuator (not illustrated).

The mold 20 is a member for holding the rotor core 2. Specifically, the mold 20 may include an upper mold 21 that abuts on an upper portion of the rotor core 2, more specifically, a top surface thereof and supports the rotor core 2, and a lower mold 22 that abuts on a lower portion of the rotor core 2, more specifically, a bottom surface thereof and supports the rotor core 2. Of them, the lower mold 22 may include a lower mold main body 23 and a stage 24 provided on the lower mold main body 23 and on which the rotor core 2 is placed. The rotor core 2 can be placed on the stage 24 and conveyed from the stage 24 by a robot arm 80 (see FIG. 3A) or the like.

In addition, a resin composition filling path 25 for supplying the resin composition P to an appropriate position of the rotor core 2 placed on the stage 24 may be provided inside the stage 24. A path structure of the resin composition filling path 25 may be changed according to a structure of the rotor core 2 placed on the stage 24. A plurality of stages 24 having different structures of resin composition filling paths 25 may be prepared in advance, and may be appropriately changed and used according to a size of the rotor core 2 held in the mold 20, a position of the slot portion 4, and the like. The lower mold 22 may further include a lifter 26 that raises and lowers the stage 24 in order to perform cleaning of the resin composition filling path 25 and the like. In the present embodiment, an aspect is exemplified in which the resin composition filling path 25 is provided in the lower mold 22 and the resin composition P is filled from the lower side, but the disclosure is not limited thereto. For example, an aspect may be adopted in which the resin composition filling path is provided in the upper mold 21, and the resin composition P is filled from the upper side.

The upper mold 21 may be movable in the up-down direction together with the top plate 13 as described above, and the upper mold 21 is lowered when the rotor core 2 is placed on the stage 24 and presses the top surface of the rotor core 2 with a predetermined pressing force, so that the rotor core 2 can be held so as to be sandwiched between the upper mold 21 and the lower mold 22. The shapes, materials, and the like of the surfaces of the upper mold 21 and the stage 24 that abut on the rotor core 2 may be adjusted such that the resin composition P does not leak to the outside of the rotor core 2 at the time of filling the resin composition P described later, in other words, the contact surfaces are in a sealed state when the rotor core 2 is sandwiched. In the present embodiment, as described above, the structure in which the upper mold 21 is moved up and down together with the top plate 13 is adopted, but other structures can be adopted as long as the positions of the upper mold 21 and the lower mold 22 in the up-down direction can be relatively changed. Specifically, for example, instead of moving the upper mold 21 in the up-down direction, a structure in which the lower mold 22 is moved in the up-down direction or both the upper mold 21 and the lower mold 22 are moved may be adopted.

In the present embodiment, as the slot portion 4 of the rotor core 2, a slot portion with a rectangular parallelepiped shape having substantially no gap in the front-rear direction and the left-right direction is exemplified. Therefore, the upper mold 21 and the lower mold 22 having substantially flat contact surfaces are adopted, but the shapes of the contact surfaces of the upper mold 21 and the lower mold 22 can be appropriately changed according to the shape of the rotor core 2 to be held. For example, when the motor core manufacturing device 1 according to the present embodiment is used for resin molding of an inner rotor type stator core, the upper mold 21 and the lower mold 22 that include protrusions to be inserted into a space formed at the center of the stator core may be adopted.

Figure 2:
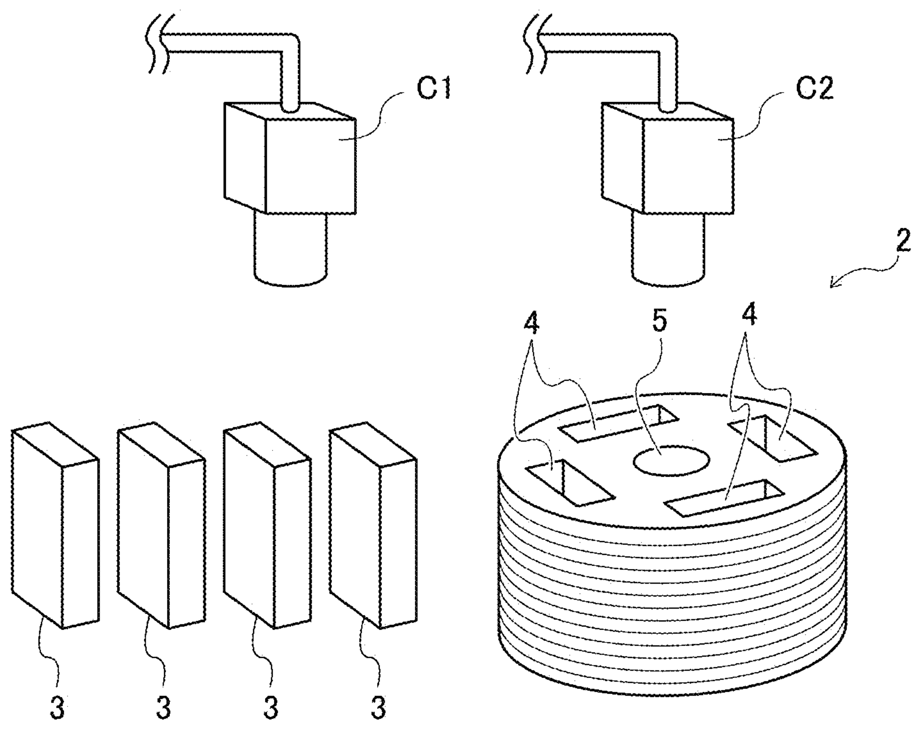
FIG. 2 is a schematic explanatory view illustrating an example of a state in which a rotor core and a permanent magnet are measured.

FIG. 2 is a schematic explanatory diagram illustrating an example of a state in which the rotor core and the permanent magnet are measured. As illustrated in FIGS. 1 and 2, the rotor core 2 held by the above-described mold 20 can be formed of a substantially cylindrical magnetic material formed by layering a plurality of thin electromagnetic steel sheets. A through hole 5 into which a shaft constituting a rotating shaft is inserted at the time of being assembled as a motor may be provided in an axial center portion of the rotor core 2. One or a plurality of (four in FIG. 2) slot portions 4 extending along the axial direction of the rotor core 2 may be provided so as to surround the through hole 5. The slot portion 4 can be formed of, for example, a through hole having a rectangular parallelepiped shape illustrated in FIG.

2 into which the permanent magnet 3 described later can be inserted, but a specific shape thereof is not particularly limited.

The permanent magnet 3 may be inserted into and fixed to the slot portion 4 of the rotor core 2. The permanent magnet 3 can be formed of, for example, a rectangular parallelepiped slightly smaller than the slot portion 4. It does not matter whether or not the permanent magnet 3 is magnetized. When the permanent magnet 3 is inserted into the slot portion 4, a gap is formed at least partially between an outer peripheral surface of the permanent magnet 3 and an inner peripheral surface of the slot portion 4. The gap can function as the filling space 6 of the resin composition P described later. When the rotor core 2 is placed on the stage 24, a part of each of a plurality of filling spaces 6 can communicate with an end portion of the resin composition filling path 25.

The chamber 30 may form a space into which a predetermined amount of the resin composition P to be filled into the filling space 6 is put. The chamber 30 may be formed inside a support base 31 provided on the base 11 so as to extend in the up-down direction. An upper end portion of the chamber 30 may communicate with the resin composition filling path 25 of the stage 24 included in the lower mold 22 disposed on the support base 31.

The plunger 35 may be a member for conveying the resin composition P conveyed into the chamber 30 toward the resin composition filling path 25. The plunger 35 according to the present embodiment may form a bottom surface of the chamber 30, and may be connected to an actuator (not illustrated) to be movable in the chamber 30 in the up-down direction.

The first heater 40 may include a known heater or the like, and may heat an appropriate position of the manufacturing device 1. The first heater 40 according to the present embodiment can include a mold heater 41 disposed in the mold 20, specifically, in the upper mold 21 and the lower mold main body 23, and a chamber heater 42 disposed around the chamber 30 in the support base 31 so as to be close to the outer periphery of the chamber 30. As the mold heater 41 and the chamber heater 42, a known heater, for example, an infrared heater or a sheath heater can be adopted.

Figure 9:
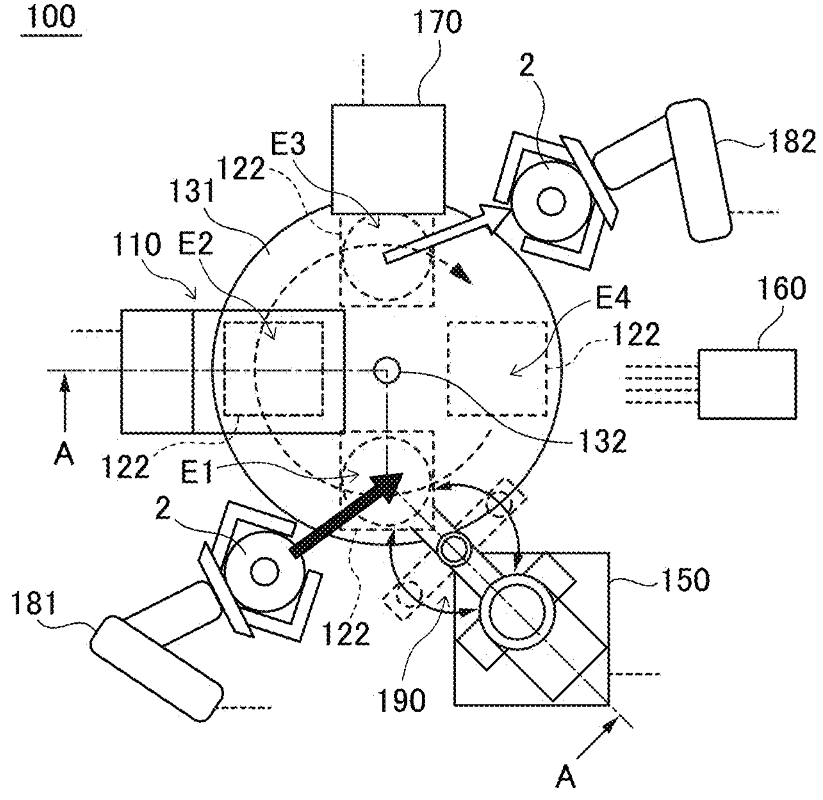
FIG. 9 is a schematic plan view illustrating an example of a motor core manufacturing device according to a second embodiment of the disclosure.
Figure 10:
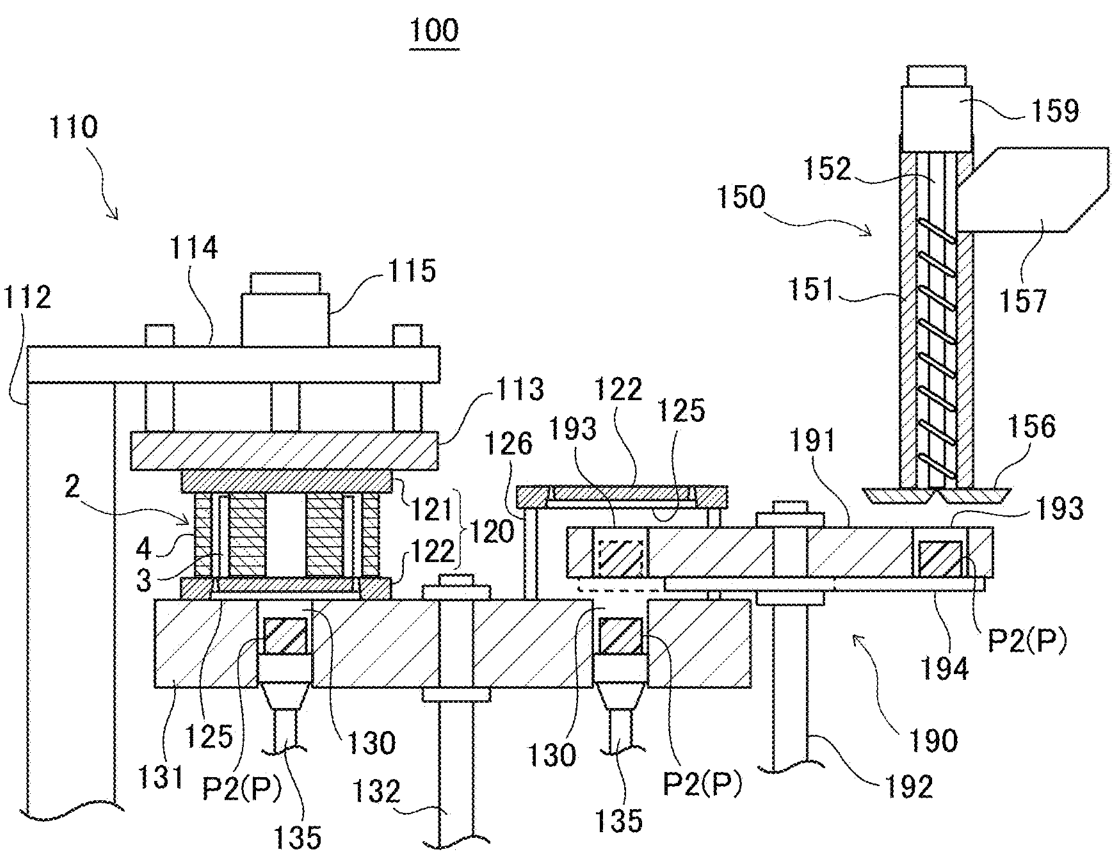
FIG. 10 is a schematic cross-sectional view taken along the line A-A in FIG. 9.

The extruding machine (sometimes referred to as an "extruder") 50 may have one end communicating with the chamber 30, and may convey a previously measured amount of the resin composition P while kneading the resin composition P toward the chamber 30. The extruding machine 50 may include at least a barrel 51 as an example of an extrusion conveyance path extending in one direction, for example, the left-right direction, in which the resin composition P is conveyed, and a screw 52 that is disposed inside the barrel 51 and conveys the resin composition P supplied into the barrel 51, for example, a powdery resin composition P1 toward the chamber 30 while kneading the resin composition. In the present embodiment, the extruding machine 50 extending in the left-right direction is exemplified. However, the extension direction of the extruding machine 50 is not limited thereto, and for example, the extruding machine 50 may extend obliquely upward from the chamber 30, or may extend in the up-down direction so as to be aligned with the chamber 30 (for example, as illustrated in FIGS. 9 and 10 to be described later). When the extruding machine 50 and the chamber 30 are disposed side by side, a space for conveying the resin composition P may be secured between the extruding machine 50 and the chamber 30. In the disclosure, a case in which the powdery resin composition P1 is supplied as the resin composition P to be supplied to the barrel 51 is exemplified, but the resin composition is not limited to the powdery resin composition, and may have other shapes. For example, at least a part thereof may have a paste shape or a pellet shape. The powdery resin composition P1 in the disclosure refers to a resin composition P1 formed of relatively small particles (including particles such as small pieces obtained by pulverizing and crushing a relatively large resin block) such as granular shapes.

The barrel 51 may be a conveyance path for conveying the resin composition P while kneading the resin composition P. A supply port 53 to which the powdery resin composition P1 is supplied may be formed at one end portion of the barrel 51, and a carry-out port 54 connected to the chamber 30 may be formed at the other end portion. A resin composition supply source 58 may be connected to the supply port 53 via a resin composition supply path 57. The carry-out port 54 may be provided with, for example, a sliding or rotary shutter 56. In addition to opening and closing the carry-out port 54, the shutter 56 may have a function of a cutter that cuts the resin composition P carried out from the carry-out port 54. Alternatively, the extruding machine 50 may have a cutter capable of cutting the resin composition P along the carry-out port 54 separately from the shutter 56.

The screw 52 can include a long member having a spiral fin formed on an outer peripheral surface, which is rotated by a motor 59 connected to one end thereof. The screw 52 may be disposed in the barrel 51 along the extension direction thereof so as to convey the powdery resin composition P1 supplied from the supply port 53 toward the carry-out port 54 while kneading the resin composition P1. When the powdery resin composition P1 is continuously supplied to the screw 52, the resin composition P that is being conveyed can be pressurized. Therefore, the powdery resin composition P1 conveyed in the barrel 51 may be gradually changed into a paste-shaped resin composition P2 by being kneaded and pressurized by the screw 52 during the conveyance. The "paste shape" mentioned herein refers to a state in which the powdery resin composition P is integrated to form a lump, and the resin composition P is formed into a paste or clay form.

The motor 59 connected to the screw 52 can adjust the conveyance amount of the resin composition P according to the rotation speed thereof. In this regard, the amount of the paste-shaped resin composition P2 (the paste-shaped resin composition P2 mentioned herein may be a mixture of the paste-shaped resin composition P2 and the powdery resin composition P1) carried into the chamber 30 from the extruding machine 50 in the present embodiment can be accurately adjusted by controlling the rotation speed of the motor 59.

The extruding machine 50 may further include a temperature sensor that detects the temperature of the powdery resin composition P1 or the paste-shaped resin composition P2 conveyed in the barrel 51 or the room temperature in the barrel 51. When the rotation speed of the motor 59 is controlled based on the detection result of the temperature sensor and the filling amount of the resin composition measured in advance, the amount of the paste-shaped resin composition P2 to be put into the chamber 30 can be adjusted more accurately. Although the extruding machine 50 according to the present embodiment is exemplified as a so-called twin-screw extruder in which two screws 52 are disposed in parallel, the number of screws 52 may be one or three or more.

In the barrel 51, a barrel heater 55 as an example of a second heater for heating the powdery resin composition P1 or the paste-shaped resin composition P2 conveyed in the barrel 51 by the screw 52 is preferably disposed. The barrel heater 55 can include a known heater similarly to the mold heater 41 and the like, and may be disposed to surround substantially the entire length of the conveyance path in the barrel 51, for example. In particular, a heater of a medium temperature control system may be used as the barrel heater 55. In the present embodiment, by operating the barrel heater 55 to heat (preheat) the powdery resin composition P1 or the paste-shaped resin composition P2, the heating time required for softening and melting the paste-shaped resin composition P2 in the chamber 30 can be significantly shortened.

The barrel heater 55 according to the present embodiment can preheat the powdery resin composition P1 or the paste-shaped resin composition P2 conveyed in the barrel 51 to from 70 to 100° C., more preferably, from 90 to 100° C. Incidentally, for example, when a conventional resin tablet molded in advance is heated to 70° C. or higher, at least a part thereof is softened, and it becomes difficult to hold and transport the resin tablet using a robot arm or the like. When the heating temperature is 90° C. or higher, softening of the resin tablet further proceeds, and holding and transportation using the robot arm become substantially impossible. Therefore, in the conventional manufacturing device, the resin composition (that is, the resin tablet) before being put into the chamber can be preheated only at a low temperature (for example, from about 40° C. to 60° C.). On the other hand, in the motor core manufacturing device 1 according to the present embodiment, the paste-shaped resin composition P2 is carried into the chamber 30 or a position adjacent to the chamber 30 by using the extruding machine 50. Therefore, even if the paste-shaped resin composition P2 is partially softened, the conveyance of the paste-shaped resin composition P2 is not hindered. As a result, the heating temperature in the barrel 51 can be set as high as from 70 to 100° C. When the heating temperature is set to from 70 to 100° C. as described above, the heating time after being carried into the chamber 30 can be significantly shortened.

When the heating temperature by the barrel heater 55 is set to a higher temperature, for example, 100° C. or higher, the paste-shaped resin composition P2 is softened in the barrel 51 to form a liquid resin composition (an example of a softened resin composition) P3, and the liquid resin composition P3 can be carried into the chamber 30. In this case, the heating time after being carried into the chamber 30 can be substantially eliminated, and the chamber heater 42 can be omitted. The entire barrel heater 55 may be set to a uniform temperature, or may be set to a non-uniform temperature. Specifically, for example, the upstream side of the extruding machine 50 can be set to a relatively high temperature for the purpose of instantaneously softening the resin composition P and suppressing a temperature decrease on the side of the supply port 53 where the temperature tends to decrease due to continuous inputting of the resin composition P. Alternatively, for the purpose of suppressing an excessive reaction of the resin composition P in the extruding machine 50, the downstream side of the extruding machine 50 or a standby space 51A can be set to a relatively high temperature.

The standby space 51A having a predetermined size without the screw 52 may be formed between the carry-out port 54 of the barrel 51 and the tip (free end) of the screw 52. The standby space 51A may be a space for temporarily storing the paste-shaped resin composition P2 kneaded and conveyed by the rotation of the screw 52. The standby space 51A may be provided with a known conveyance means (not illustrated) such as a belt conveyor or a scraper. The conveyance means is operated in conjunction with the opening of the shutter 56, so that a specific amount of the paste-shaped resin composition P2 temporarily stored in the standby space 51A can be immediately carried into the chamber 30. A structure in which the paste-shaped resin composition P2 conveyed by the screw 52 is carried into the chamber 30 as it is without providing the standby space 51A may be adopted. In this case, the opened state of the shutter 56 is maintained until a specific amount of paste-shaped resin composition P2 is carried into the chamber 30.

In the present embodiment, the structure in which the carry-out port 54 of the barrel 51 is connected to the chamber, the standby space 51A is provided adjacent to the carry-out port 54, and the conveyance means (not illustrated) is operated, so that the paste-shaped resin composition P2 is directly carried from the extruding machine 50 into the chamber 30 is exemplified. However, the disclosure is not limited thereto. For example, a conveyance mechanism (not illustrated) may be provided between the carry-out port 54 of the barrel 51 and the chamber 30, and the paste-shaped resin composition P2 may be carried into the chamber 30 by operating the conveyance mechanism. Similarly, a mechanism for removing air from the kneaded paste-shaped resin composition P2 may be additionally provided between the carry-out port 54 of the barrel 51 and the shutter 56 or the chamber 30. The mechanism may be, for example, a mechanism for removing air from the paste-shaped resin composition P2 by compressing the paste-shaped resin composition P2 or providing a decompression chamber.

Here, it should be particularly noted that the resin composition P directly or indirectly carried into the chamber 30 from the extruding machine 50 is not molded into a shape of a tablet molded in advance, but is the paste-shaped resin composition P2. The motor core manufacturing device 1 according to the present embodiment makes it possible to put (carry) the paste-shaped resin composition P2 into the chamber 30 by using the extruding machine 50, and to freely adjust the amount of the resin composition P put into the chamber 30 by controlling the rotation speed of the motor 59 or the like. The paste-shaped resin composition P2 carried into the chamber 30 from the extruding machine 50 may be temporarily molded into a predetermined shape. As a method of the temporary molding, for example, there is a method in which the paste-shaped resin composition P2 is continuously conveyed to the standby space 51A, and the paste-shaped resin composition P2 is pressed against the shutter 56 to increase the density, thereby performing the temporary molding. The pressing operation of the paste-shaped resin composition P2 described above may be realized by temporarily moving the screw 52 along the conveyance direction. Alternatively, the resin composition may be temporarily taken out from the extruding machine 50 without directly connecting the extruding machine 50 and the chamber 30, temporarily molded into an arbitrary shape with a jig or the like, and then conveyed to the chamber.

Figure 3A:
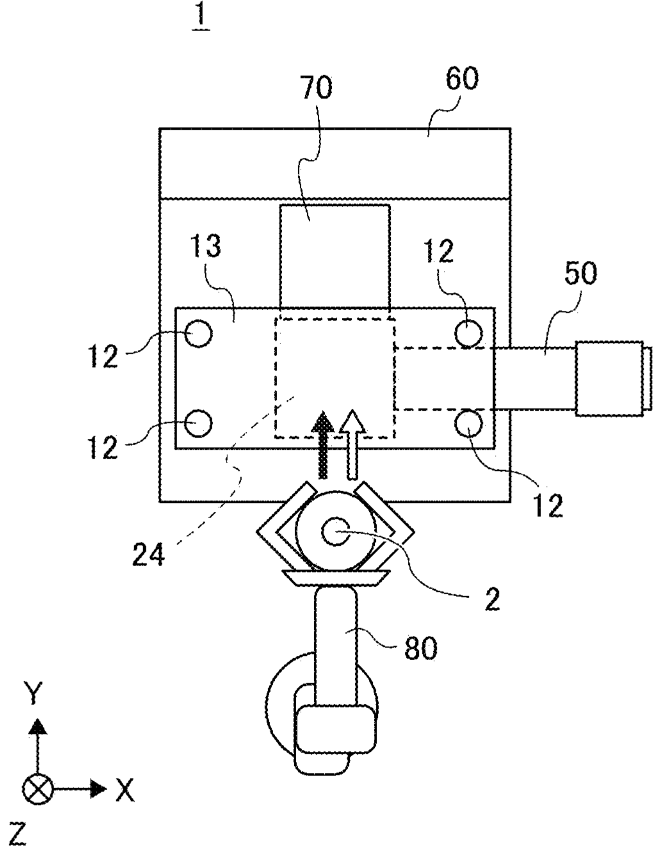
FIG. 3A is a schematic plan view illustrating an example of an overall structure of the motor core manufacturing device illustrated in FIG. 1.
Figure 3B:
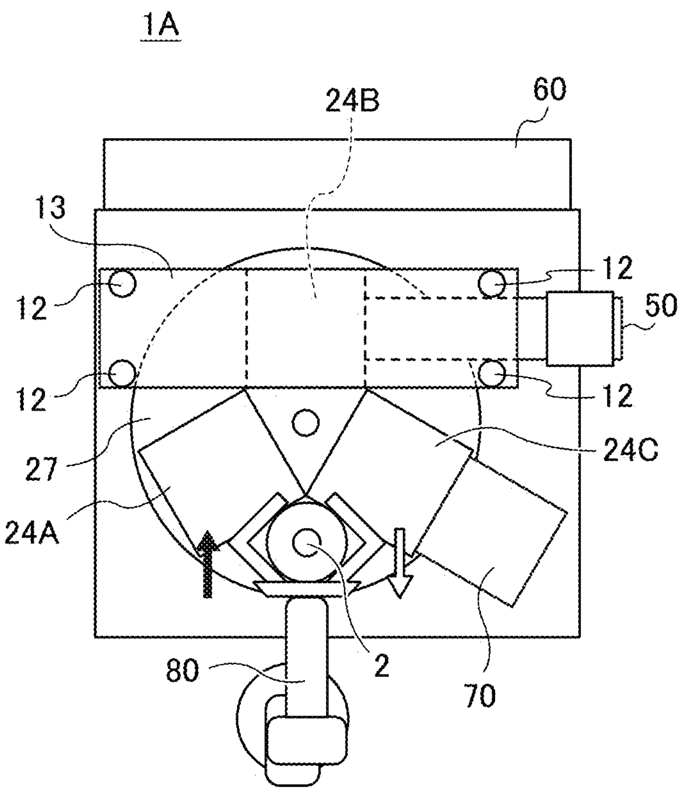
FIG. 3B is a schematic plan view illustrating a modification of the overall structure of the motor core manufacturing device.

FIG. 3 is a schematic plan view illustrating an example of an overall structure of the motor core manufacturing device, FIG. 3A illustrates the motor core manufacturing device illustrated in FIG. 1, and FIG. 3B illustrates a modification of the motor core manufacturing device. In order to control each component such as the motor 59 described above, the manufacturing device 1 according to the present embodiment can further include a control device 60 as illustrated in FIGS. 1 and 3A. For example, as indicated by a dotted line in FIG. 1, the control device 60 may be communicably connected to each component via wired or wireless communication. The control device 60 can be realized by using a sequencer (Programmable Logic Controller, PLC) or a known computer.

As illustrated in FIG. 3A, the motor core manufacturing device 1 according to the present embodiment may further include a cleaning unit 70 for cleaning the mold 20 and the like after filling of the resin composition P is completed, and a robot arm 80 for placing the rotor core 2 on the stage 24 or carrying out the rotor core 2 subjected to resin molding.

Since the motor core manufacturing device 1 according to the present embodiment has the above-described series of configurations, it is possible to perform resin molding using the powdery or paste-shaped resin composition P instead of a tablet-shaped resin composition molded in advance. At that time, since the amount of the resin composition P conveyed to the chamber 30 (that is, the amount of the resin composition P put into the chamber 30) can be freely adjusted by controlling the rotation speed of the motor 59 or the like, loss of the resin composition P can be suppressed. Therefore, it is not necessary to select a resin tablet according to the amount of the resin composition filled into the motor core (the resin composition filling amount).

According to the motor core manufacturing device 1 according to the present embodiment, not only the preheating of the mold 20 and the rotor core 2 but also the preheating of the powdery resin composition P1 or the paste-shaped resin composition P2 before being put into the chamber 30 can be performed at a high temperature. Therefore, the heating time of the resin composition P in the chamber 30 can be shortened or omitted, and the number of rotor cores 2 that can be manufactured per unit time can be increased.

As an option, a kneading machine (sometimes referred to as a "kneader") separated from the extruding machine 50 may be provided in the motor core manufacturing device 1 according to the present embodiment described above. The kneading machine can be provided on the upstream of the extruding machine 50 or between the extruding machine 50 and the chamber 30. By further adopting such a kneading machine, the kneading of the resin composition P can be performed more reliably. Kneading in the extruding machine 50 can be reduced, and the extruding machine 50 can be downsized. When the kneading machine is provided between the extruding machine 50 and the chamber 30, defoaming of gas contained in the resin composition P can be promoted.

As illustrated in FIG. 3A, the motor core manufacturing device 1 according to the present embodiment described above executes resin molding of the rotor core 2 using the single stage 24, but may be a device using a plurality of stages in order to improve the production efficiency of the rotor core 2 per unit time. Hereinafter, as a modification of the present embodiment, a motor core manufacturing device 1A including a plurality of stages will be briefly described. The motor core manufacturing device 1A according to the present modification is similar to the motor core manufacturing device 1 described above, except that the motor core manufacturing device 1A includes a plurality of stages (specifically, three stages). Therefore, configurations similar to those of the motor core manufacturing device 1 will be denoted by the same reference numerals, description thereof will be omitted, and description will be given focusing on configuration portions different from those of the motor core manufacturing device 1.

As illustrated in FIG. 3B, the motor core manufacturing device 1A according to the present modification can include a turntable 27 as an example of a transfer unit in which the lower mold 22 has three stages 24A to 24C, and one stage (stage 24B in FIG. 3B) of the three stages 24A to 24C can be disposed at a position facing the upper mold 21. The turntable 27 may be a substantially disk-shaped member that can be rotated in one direction (for example, a clockwise direction in FIG. 3B) based on a control signal or the like from the control device 60. By sequentially changing the stage facing the upper mold 21 by rotating the turntable 27, a time required for replacing the rotor core 2 on the stage can be shortened, and continuous resin molding can be performed in a short time.

In addition, if the cleaning unit 70 is disposed so as to be adjacent to another stage (the stage 24C in FIG. 3B) located on the downstream side in the rotation direction when one stage faces the upper mold 21, the resin molding of the rotor core 2 placed on the other stage can be executed in parallel during the cleaning of another stage. In the present modification, the case in which the three stages 24A to 24C are disposed on the turntable 27 is exemplified, but the number of stages disposed on the turntable 27 is not limited to three. In the present modification, the disk-shaped turntable 27 is exemplified as the transfer unit. However, for example, a transfer unit having another structure such as a known belt conveyor can also be adopted.

<Motor Core Manufacturing Method>

Next, a motor core manufacturing method according to the present embodiment will be described. In the following description, a case in which resin molding of the rotor core 2 is performed using the above-described motor core manufacturing device 1 will be exemplified, but the motor core manufacturing method of the disclosure can be implemented by a device other than the manufacturing device 1. The motor core manufacturing method illustrated below can be mainly implemented by the control device 60 of the motor core manufacturing device 1. Therefore, the motor core manufacturing method according to the present embodiment can be provided in the form of a program for causing a processor of a computer constituting the control device 60 to execute a predetermined operation or in the form of a non-volatile computer-readable medium storing the program. The following description of effects and the like also serves as the description of effects of the manufacturing device 1 according to the present embodiment.

FIG. 4 is a flowchart illustrating an example of the motor core manufacturing method according to the first embodiment of the disclosure. FIGS. 5 to 7 are operation explanatory diagrams illustrating an example of an operation state of the motor core manufacturing device illustrated in FIG. 1. Hereinafter, description will be made mainly with reference to FIGS. 4 to 7. In FIGS. 5 to 7, in order to make the drawings easily viewable, reference numerals are given mainly to those related to each operation, and reference numerals of members less related to the operation may be omitted.

The motor core manufacturing method according to the present embodiment first measures the filling amount of the resin composition P (the resin composition filling amount) into the filling space 6 of the rotor core 2 (step S1). In measuring the filling amount, for example, as illustrated in FIG. 2, the volume of the slot portion 4 of the rotor core 2 and the volume of the permanent magnet 3 inserted into the slot portion 4 are measured using a measurement means, for example, cameras C1 and C2, and a difference therebetween is calculated, whereby the filling amount can be measured. The measured resin filling amount is sent to the control device 60, and can be used for controlling the amount of the resin composition P put into the chamber 30, specifically, the rotation speed of the motor 59 and the like. The measurement means of the volumes of the slot portion 4 and the permanent magnet 3 is not limited to the cameras C1 and C2 described above, and a non-contact type measurement means or a contact type measurement means (caliper or the like) other than the cameras C1 and C2 can be appropriately used. In the present embodiment, the case in which the permanent magnet 3 to be inserted into the slot portion 4 is specified in advance is exemplified, but instead of this, the permanent magnet 3 having an appropriate size may be selected according to the size of the slot portion 4 measured by the camera C2. In this case, the clearance (that is, the filling space 6) between the slot portion 4 and the permanent magnet 3 can be made substantially equal in each slot portion 4, and the amount of resin filled into each slot portion 4 can be made uniform.

In step S1 described above, the case in which the filling amount of the resin composition to be put into the chamber 30 is determined by measuring the volume of the slot portion 4 and the volume of the permanent magnet 3 using the cameras C1 and C2 is exemplified. However, the filling amount may be determined by another method. Specifically, for example, a trial production process may be executed before starting mass production, and the filling amount may be determined from the filling amount of the resin, the amount of excess resin, and the like in the trial production process. Alternatively, the actual resin filling amount, the excess resin, and the like may be checked at a frequency that does not interfere with the mass production during the mass production, and the filling amount may be feedback-controlled to maintain a suitable filling amount. The above-described various methods for determining the filling amount can be executed singly or in combination.

Figure 5A:
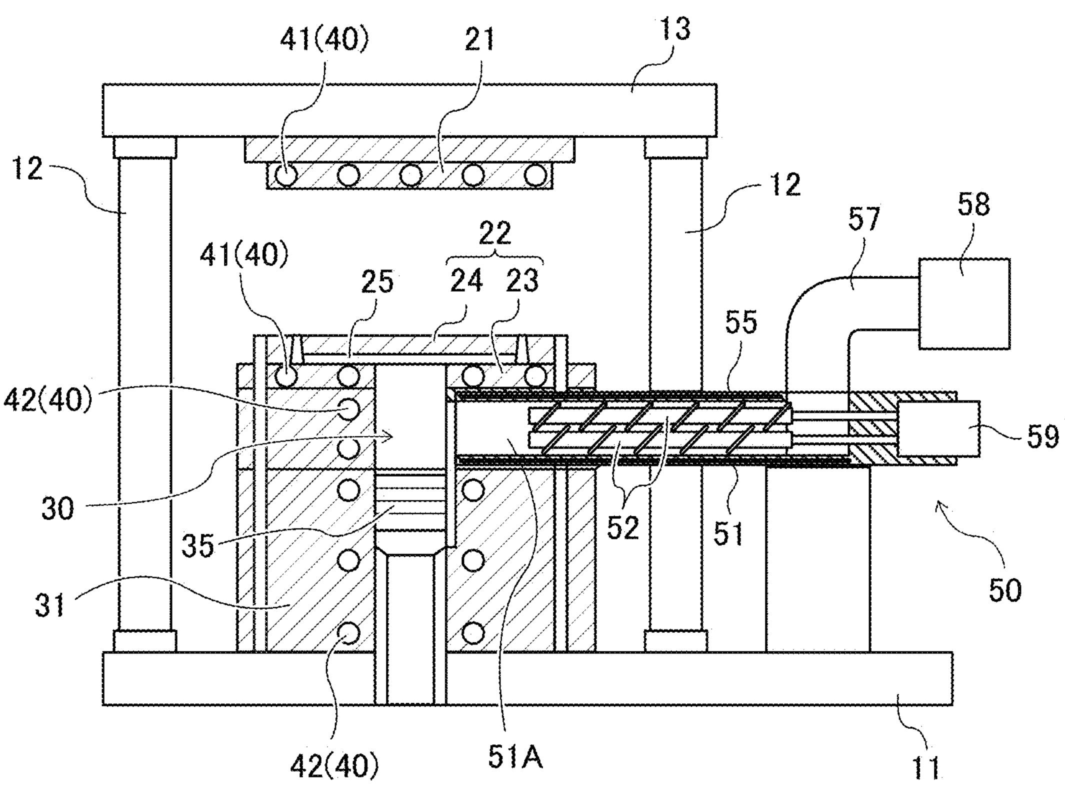
FIG. 5A is an operation explanatory diagram illustrating an example of an operation state of the motor core manufacturing device illustrated in FIG. 1.
Figure 6A:
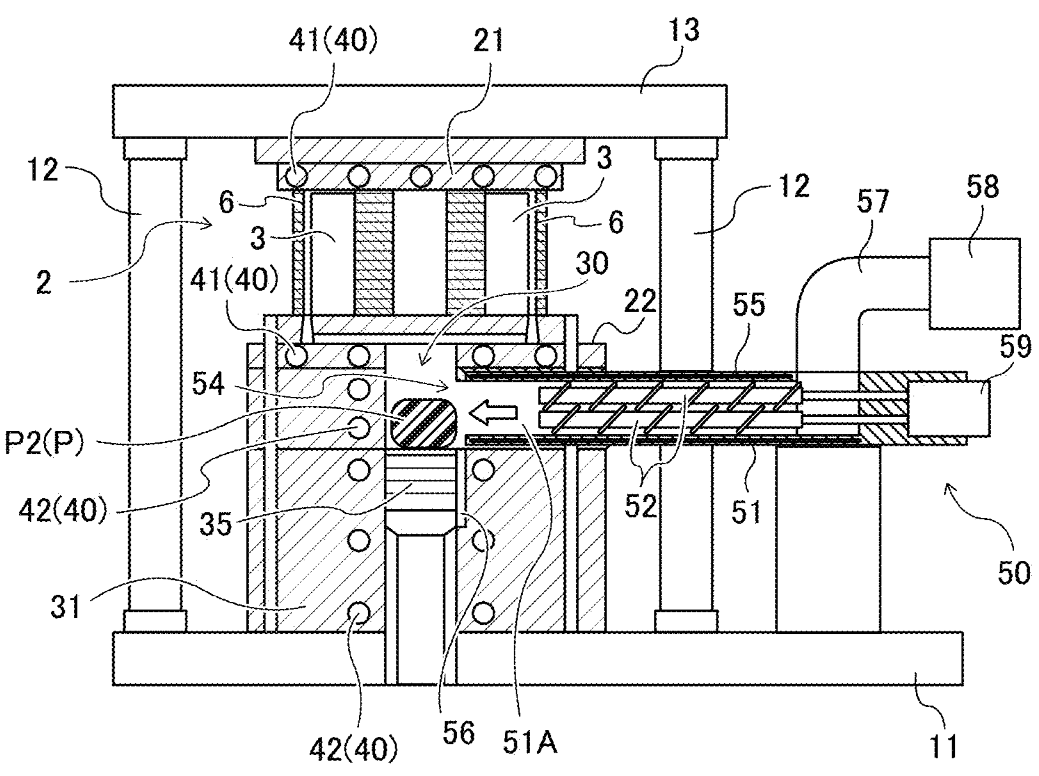
FIG. 6A is an operation explanatory diagram illustrating an example of an operation state of the motor core manufacturing device illustrated in FIG. 1.

When the measurement of the filling amount is completed, next, the permanent magnet 3 is inserted into the slot portion 4 of the rotor core 2 (step S2). Then, the mold 20 and the rotor core 2 are preheated (step S3). The preheating of the mold 20 can be realized by operating the mold heater 41. At this time, the chamber 30 may be preheated together with the mold 20. The preheating of the chamber 30 can be realized by operating the chamber heater 42. The preheating of the rotor core 2 can be performed using a known heating means (not illustrated). As illustrated in FIG. 5A, the preheating of the rotor core 2 may be performed separately from the mold 20 before the rotor core 2 is placed on the stage 24, or may be performed simultaneously with the preheating of the mold 20 by preheating in a state in which the rotor core 2 is placed on the stage 24. The preheating temperature of the mold 20 and the rotor core 2 may be from about 100 to 180° C. The preheating may be performed on only one of the mold 20 and the rotor core 2.

When the preheating of the mold 20 and the rotor core 2 is completed, the rotor core 2 is placed on the stage 24, and the upper mold 21 is moved downward to hold the rotor core 2 in the mold 20 (step S4). At this time, the upper mold 21 is adjusted so as to press the top surface of the rotor core 2 with a predetermined pressure, so that the upper mold 21 and the top surface of the rotor core 2, and the lower mold 22 and the bottom surface of the rotor core 2 may be brought into close contact with each other. A part of the measurement of the filling amount of the resin composition P in the filling space 6 of the rotor core 2 can be performed when the rotor core 2 is held. Specifically, the height of the slot portion 4 in the up-down direction can be specified from a control signal of an actuator (not illustrated) used when the upper mold 21 is moved in the up-down direction, and can be used to measure the filling amount.

Next, the powdery resin composition P1 is kneaded, conveyed, and heated using the extruding machine 50 (step S5). In this step, first, the powdery resin composition P1 is supplied (for example, continuously) from the resin composition supply source 58 to the supply port 53 of the barrel 51, and the motor 59 is driven to rotate the screw 52, so that the powdery resin composition P1 supplied to the supply port 53 is conveyed to the carry-out port 54 while being kneaded. In parallel with this conveyance operation, the barrel heater 55 is driven to preheat the powdery resin composition P1 conveyed by the screw 52 or the paste-shaped resin composition P2 changed by kneading or the like. The preheating temperature by the barrel heater 55 may be adjusted in a range of from 70 to 100° C. Since the resin composition P to be preheated is preheated while being stirred by the screw 52, the resin composition P is uniformly heated. Most of the granular resin composition P1 may be changed into the paste-shaped resin composition P2 by the kneading, conveying, and heating described above.

Figure 5B:
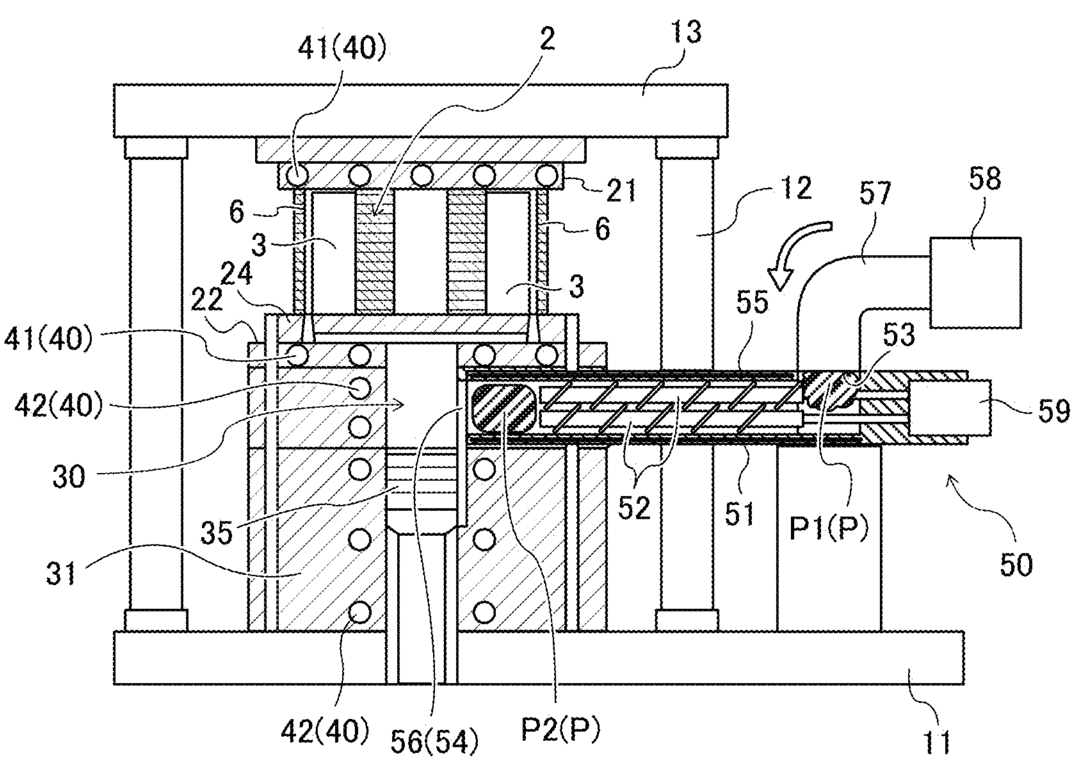
FIG. 5B is an operation explanatory diagram illustrating an example of an operation state of the motor core manufacturing device illustrated in FIG. 1.

In step S5, the rotation speed of the motor 59 may be controlled by the control device 60, so that the powdery resin composition P1 in an amount matched with the filling amount of the resin composition P measured in step S1 is conveyed to the standby space 51A while being changed into the paste-shaped resin composition P2 (see FIG. 5B). However, the amount matched with the filling amount of the resin composition P mentioned herein refers to not only the volume of the filling space 6 but also an amount necessary for filling the filling space 6 with the resin composition P, such as the volume of the resin composition filling path 25 or the like. Adjustment of the amount of the paste-shaped resin composition P2 to be put into the chamber 30 is not limited to the method performed based on the rotation speed of the motor 59 described above, and can be performed by controlling various configurations of the motor core manufacturing device 1. For example, the amount of the paste-shaped resin composition P2 to be carried into the chamber 30 may be adjusted by adjusting the amount of the powdery resin composition P1 supplied from the resin composition supply source 58 so as to be matched with the filling amount of the resin composition measured in step S1. By providing a sensor (not illustrated), for example, a weight sensor, in the standby space 51A, the amount of the paste-shaped resin composition P2 stored in the standby space 51A may be measured and compared with the filling amount of the resin composition measured in advance, whereby the amount of the paste-shaped resin composition P2 carried into the chamber 30 may be adjusted. Examples of an adjustment method other than the above-described adjustment method will be described later.

When the operations of kneading, conveying, and heating in the extruding machine 50 described above are completed, as illustrated in FIG. 6A, the shutter 56 is opened, and the paste-shaped resin composition P2 temporarily stored in the standby space 51A is carried into the chamber 30 using a conveyance means (not illustrated) (step S6). The paste-shaped resin composition P2 temporarily stored in the standby space 51A is adjusted to an amount matched with the filling amount of the resin composition measured as described above. In addition, the paste-shaped resin composition P2 temporarily stored in the standby space 51A is preheated to from 70 to 100° C. by heating by the barrel heater 55. The paste-shaped resin composition P2 is changed into a paste form by the above-described preheating or the like, and can be in a lump form as a whole, but can be carried into the chamber 30 without any problem.

When the paste-shaped resin composition P2 is put into the chamber 30, the shutter 56 is then closed, and the chamber heater 42 is operated to heat and soften the paste-shaped resin composition P2 (step S7). The chamber heater 42 can be controlled to heat the paste-shaped resin composition P2 in the chamber 30 to from about 100 to 180° C., for example. By the heating, the paste-shaped resin composition P2 is softened and melted to be changed into the liquid resin composition P3 having high fluidity. Here, in the motor core manufacturing method according to the present embodiment, since the paste-shaped resin composition P2 is already preheated to from 70 to 100° C. in step S5, the time required for softening in the chamber 30 is shorter than before.

Figure 6B:
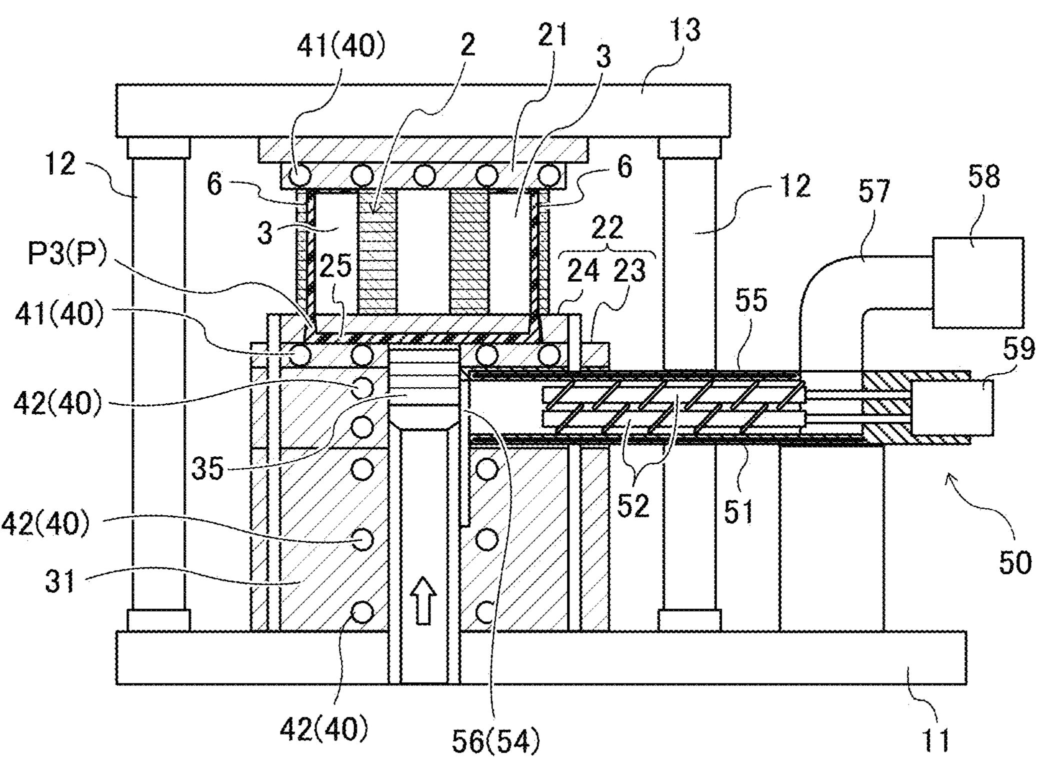
FIG. 6B is an operation explanatory diagram illustrating an example of an operation state of the motor core manufacturing device illustrated in FIG. 1.
Figure 7A:
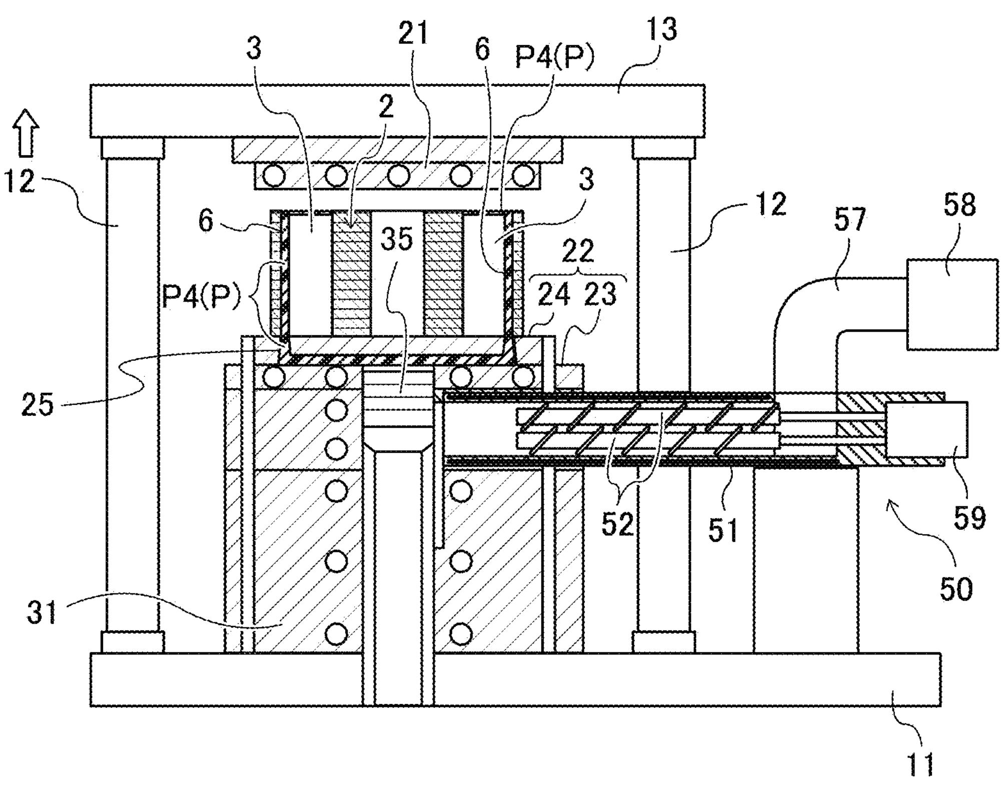
FIG. 7A is an operation explanatory diagram illustrating an example of an operation state of the motor core manufacturing device illustrated in FIG. 1.
Figure 7B:
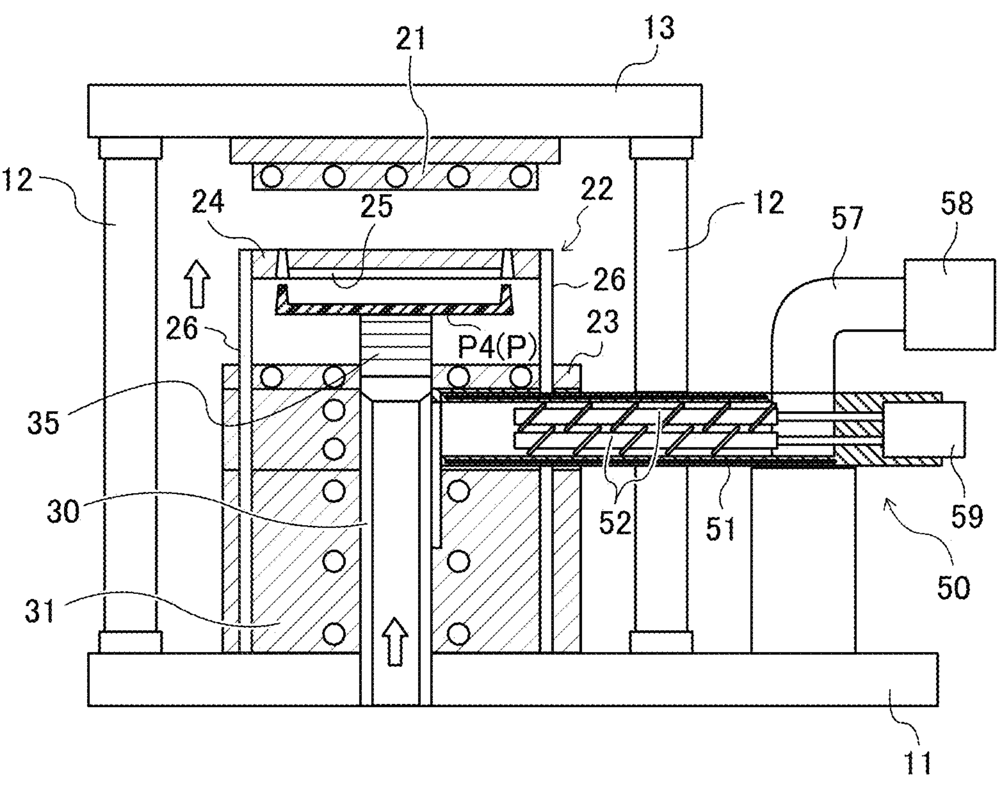
FIG. 7B is an operation explanatory diagram illustrating an example of an operation state of the motor core manufacturing device illustrated in FIG. 1.

When the paste-shaped resin composition P2 is changed into the liquid resin composition P3, next, as illustrated in FIG. 6B, the plunger 35 is raised to push up the liquid resin composition P3 toward the filling space 6 of the rotor core 2, thereby performing filling (or sealing) of the resin composition P (step S8). The liquid resin composition P3 pushed up by the plunger 35 passes through the resin composition filling path 25 from the chamber 30, and flows into the filling space 6. In order to smoothly fill the filling space 6 with the liquid resin composition P3 in step S8, for example, an air hole (not illustrated) for removing air in the filling space 6 may be provided at an appropriate position of the upper mold 21.

When the filling of the filling space 6 with the liquid resin composition P3 is completed, the mold heater 41 is operated to harden the liquid resin composition P3 in the filling space 6 (step S9). When the liquid resin composition P3 is hardened, for example, the resin composition P3 may be heated at from 100 to 180° C. for several minutes. The liquid resin composition P3 is changed into the resin composition P4 hardened by the heating, so that the permanent magnet 3 is fixed inside the slot portion 4 of the rotor core 2 by resin molding. The heating time in step S9 can be appropriately adjusted according to the specific composition and the like of the resin composition P.

When the series of resin molding steps described above is completed, as illustrated in FIG. 7A, the upper mold 21 is raised, and the resin-molded rotor core 2 is carried out using the robot arm 80 (step S10). The carried-out rotor core 2 can be transferred to another device, for example, for attaching a shaft. When the carrying-out of the rotor core 2 is completed, the manufacturing device 1 is cleaned (step S11). The cleaning of the manufacturing device 1 may be performed by the cleaning unit 70 (see FIG. 3A). The cleaning unit 70 may include a cleaning member such as a brush, and can clean the movement path of the resin composition P and the surface of the mold 20.

For example, in the case of cleaning the resin composition filling path 25 of the stage 24, the operation may be performed as follows. That is, first, the lifter 26 is operated to separate the stage 24 from the lower mold main body 23, so that the hardened resin composition P4 closing the resin composition filling path 25 is removed from the resin composition filling path 25, and the hardened resin composition P4 is also separated from the lower mold main body 23 by further raising the plunger 35. Then, the separated hardened resin composition P4 is held and removed by a robot arm (not illustrated) or the like, and the surfaces of the stage 24 and the lower mold main body 23 and the inside of the resin composition filling path 25 are cleaned with a brush or the like. When the series of cleaning is completed, the state returns to the state illustrated in FIG. 5A and becomes a standby state until next carrying-in of the rotor core 2.

The order of the series of steps described above can be changed within a range in which the function can be maintained. For example, the conveyance and preheating of the powdery resin composition P1 or the paste-shaped resin composition P2 by the extruding machine 50 can be started after the filling amount of the resin composition P can be measured. The preheating of the mold 20, the rotor core 2, the powdery resin composition P1, and the like can be omitted.

As described above, according to the motor core manufacturing method according to the present embodiment, a tablet-shaped resin composition molded in advance is not employed as the resin composition P to be put into the chamber 30, and a necessary amount of the resin composition P can be stably put into the chamber 30 using the extruding machine 50, so that loss of the resin composition P can be suppressed. Therefore, it is not necessary to select a resin tablet according to the amount of resin filled into the motor core.

According to the motor core manufacturing method according to the present embodiment, not only the preheating of the mold 20 and the rotor core 2 but also the preheating of the powdery resin composition P1 or the paste-shaped resin composition P2 before being put into the chamber 30 can be performed at a high temperature. Therefore, the heating time of the resin composition P in the chamber 30 can be shortened or omitted, and the number of rotor cores 2 that can be manufactured per unit time can be increased.

Another example of a method for adjusting the amount of the resin composition P put into the chamber 30 in the motor core manufacturing device 1 and the motor core manufacturing method according to the present embodiment described above will be described below.

Figure 8A:
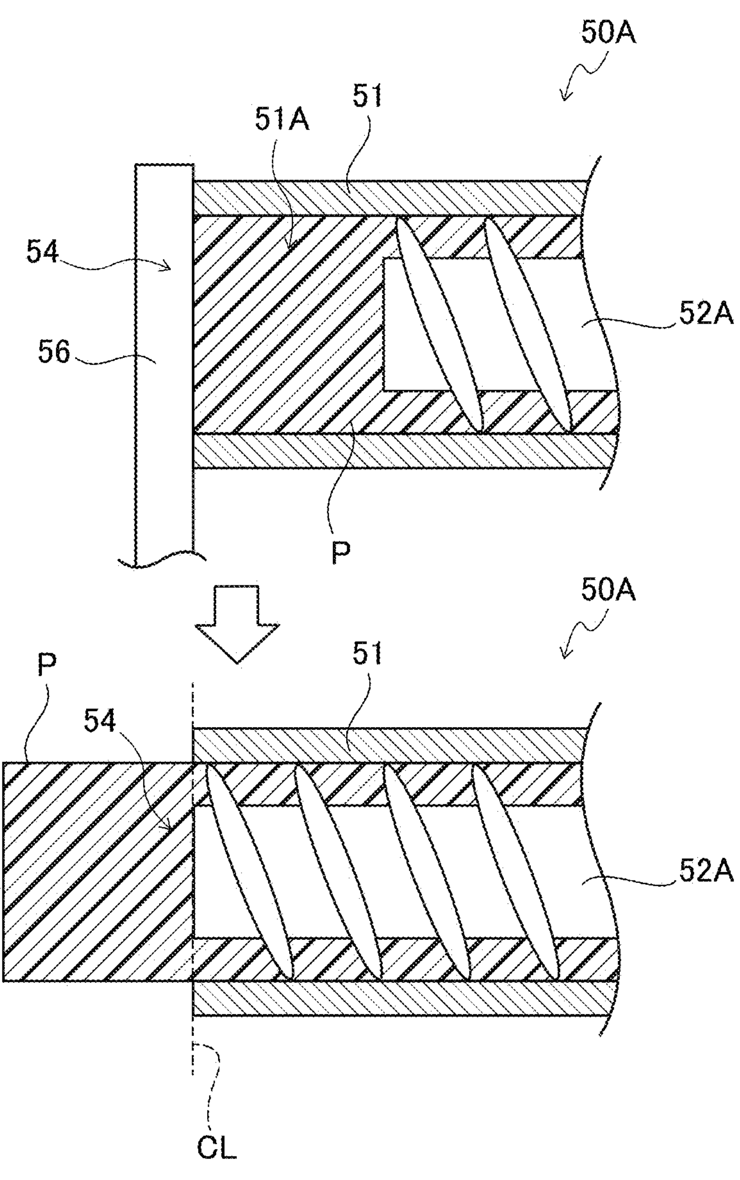
FIG. 8A is a schematic enlarged view illustrating a modification of an extruding machine illustrated in FIG. 1.
Figure 8B:
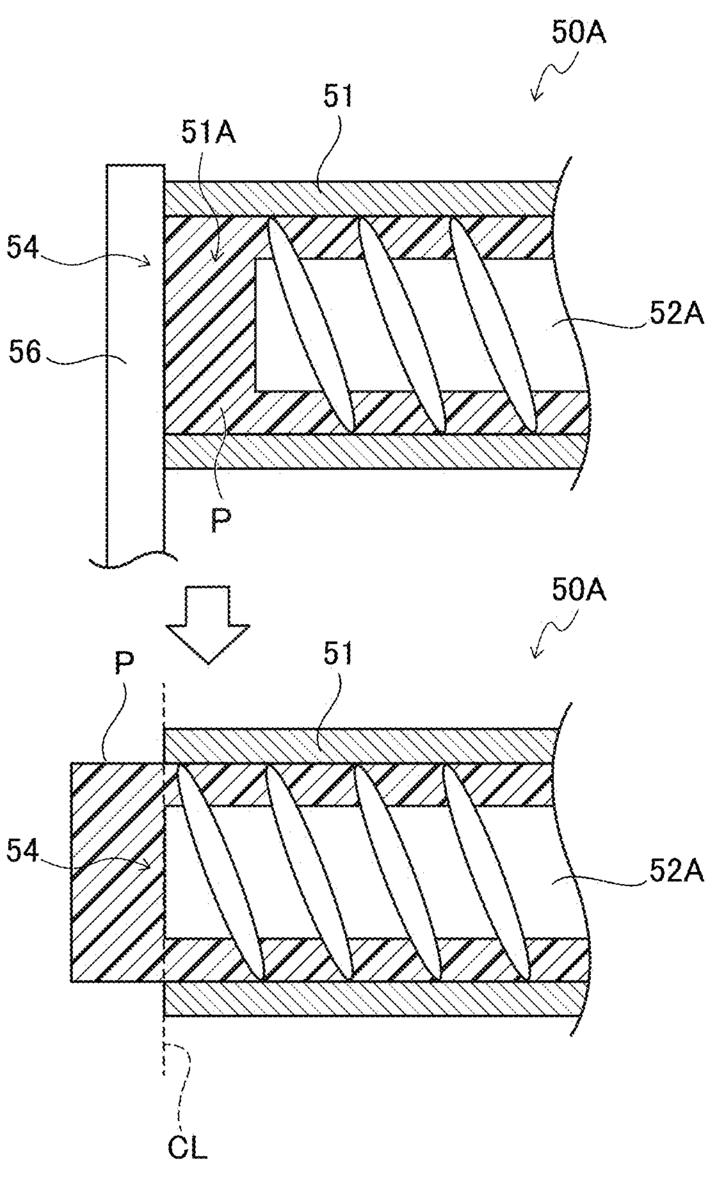
FIG. 8B is a schematic enlarged view illustrating a modification of the extruding machine illustrated in FIG. 1.

FIG. 8 illustrates a modification of the extruding machine illustrated in FIG. 1, FIG. 8A is a schematic enlarged view illustrating an enlarged tip portion of the extruding machine when the resin composition filling amount is large, and FIG. 8B is a schematic enlarged view illustrating an enlarged tip portion of the extruding machine when the resin composition filling amount is small. In the motor core manufacturing device of the disclosure, the resin composition P to be put into the chamber 30 may be adjusted using an extruding machine 50A having a configuration illustrated in FIG. 8. As illustrated in FIG. 8, in the extruding machine 50A according to the present modification, a screw 52A may be movable along the conveyance direction of the resin composition P by a slide mechanism (not illustrated). In order to simplify the configuration of the extruding machine 50A illustrated in FIGS. 8A and 8B, the extruding machine 50A including only one screw 52A is exemplified.

The adjustment of the filling amount of the resin composition P using the extruding machine 50A including the slide mechanism described above can be performed by adjusting the position of the screw 52A. Specifically, for example, when the resin composition filling amount is relatively large, as illustrated in FIG. 8A, first, the screw 52A is slid to adjust the size of the standby space 51A formed between the tip of the screw 52A and the carry-out port 54 according to a desired resin composition filling amount. Next, the screw 52A is rotated to convey the resin composition P while kneading the resin composition P, whereby the resin composition P is carried into the standby space 51A. At this time, by continuously carrying the resin composition P in the standby space 51A, the resin composition P is compressed between the shutter 56 and the screw 52A, and the inside of the standby space 51A can be filled with the resin composition P.

When the filling of the standby space 51A with the resin composition P is completed by the rotation of the screw 52A, the shutter 56 is opened, and the slide mechanism is operated to move the screw 52A together with the resin composition P in the conveyance direction. Then, when the tip of the screw 52A reaches the same position as the carry-out port 54 in the conveyance direction, the slide mechanism is stopped to cut the resin composition P along a cutting line CL illustrated in FIG. 8A. The separated resin composition P can be put into the chamber 30.

When the resin composition filling amount is relatively small, as illustrated in FIG. 8B, the slide mechanism is operated to move the tip of the screw 52A to the downstream side in the conveyance direction as compared with the case of FIG. 8A, thereby adjusting the standby space 51A to be relatively small. After this adjustment operation, when an operation similar to the operation in the case in which the filling amount of the resin composition is large is performed, a relatively small amount of the resin composition can be put into the chamber 30.

According to the above adjustment method, the amount of the resin composition P to be put into the chamber 30 can be adjusted by sliding the screw 52A to adjust the size of the standby space 51A. The method for adjusting the filling amount of the resin composition can be assumed in addition to the modification described above. For example, in the modification described above, the size of the standby space 51A is adjusted according to the amount of the resin composition to be put into the chamber 30. However, instead of this, the amount of the resin composition to be put into the chamber 30 can be adjusted by adjusting the amount of movement of the screw 52A by the slide mechanism when the resin composition P is carried out from the carry-out port 54.

Specifically, in a case in which the amount of the resin composition to be put into the chamber 30 is large, the tip of the screw 52A is moved to the same position as the carry-out port 54 in the conveyance direction when the shutter 56 is opened and the resin composition P is carried out together with the screw 52A. However, in a case in which the amount of the resin composition to be put into the chamber 30 is small, the tip of the screw 52A is moved to a predetermined position on the upstream side of the position of the carry-out port 54 in the conveyance direction. As described above, the amount of the resin composition P to be put into the chamber 30 may be adjusted based on the sliding movement amount of the screw 52 when the resin composition P is carried out.

Alternatively, although not illustrated, the amount of the resin composition P put into the chamber can be substantially adjusted by compressing the resin composition carried into the standby space using the rotational force of the screw. That is, in a case in which the amount of the resin composition to be put into the chamber is large, the screw is rotated to relatively increase the amount of the resin composition to be carried out into the standby space, so that the resin composition carried into the standby space is compressed using the rotational force of the screw to form a high-density resin composition, and in a case in which the amount of the resin composition to be put into the chamber is small, the screw is rotated to relatively reduce the amount of the resin composition to be carried out into the standby space, so that the compression action using the rotational force of the screw on the resin composition carried into the standby space is reduced to form a low-density resin composition. In this case, the density of the resin composition in the standby space can be estimated by measuring the reaction force acting on the screw.

Second Embodiment

In a motor core manufacturing device 1 according to the first embodiment described above, a case in which an extruding machine 50 extends in a left-right direction is exemplified, but an extension direction of the extruding machine is not limited thereto. Therefore, a motor core manufacturing device 100 including an extruding machine 150 extending in an up-down direction will be briefly described below as a second embodiment of the disclosure.

FIG. 9 is a schematic plan view illustrating an example of the motor core manufacturing device according to the second embodiment of the disclosure. FIG. 10 is a schematic cross-sectional view taken along the line A-A in FIG. 9. As illustrated in FIGS. 9 and 10, the motor core manufacturing device 100 according to the present embodiment may mainly include a mold 120 that is capable of holding a rotor core, a chamber 130 that is formed in the mold 120 and has one end portion communicating with a resin composition filling path 125 communicating with a slot portion 4 of a rotor core 2, a plunger 135 that conveys a resin composition P in the chamber 130 toward the resin composition filling path 125, a heater (not illustrated) that is disposed in the mold 120, or in the mold 120 and around the chamber 130, and an extruding machine 150 that conveys the resin composition P while kneading the resin composition P in order to put the resin composition P into the chamber 130. Contents described in the first embodiment are applied to configurations similar to those of the motor core manufacturing device 1 according to the first embodiment among various configurations of the motor core manufacturing device 100 according to the present embodiment, and the description thereof will be omitted below.

As illustrated in FIG. 9, a plurality of chambers 130 of the motor core manufacturing device 100 according to the present embodiment may be formed on a turntable 131, for example, four chambers may be formed at equal intervals in a circumferential direction. The turntable 131 can include a disk-shaped member having a predetermined wall thickness, and can be rotated at arbitrary timing by rotatably supporting a center portion of the turntable by a rotating pillar 132.

A plurality of work areas E1 to E4 may be provided on the turntable 131. Specifically, a first work area E1 for inputting the resin composition P into the chamber 130 and installing the rotor core 2 on a lower mold 122, a second work area E2 for injecting the resin composition P into the slot portion 4 of the rotor core 2 and hardening the resin composition P, a third work area E3 for carrying out the rotor core 2 after completion of the injection and hardening of the resin composition P and cleaning the lower mold 122 and the like, and a fourth work area E4 for performing temperature adjustment and the like of the lower mold 122 and the chamber 130 may be provided. The work content in each work area and the number of work areas are not limited to those described above, and can be appropriately changed.

The mold 120 is a member for holding the rotor core 2, and may include a lower mold 122 disposed on each of the plurality of chambers 130 and an upper mold 121 attached to a top plate 113 of a device main body 110 described later. The resin composition filling path 125 connecting the chamber 130 and the slot portion 4 may be formed in the lower mold 122.

The plunger 135 is movable in the chamber 130 in the up-down direction, and may be installed in each of the plurality of chambers 130. An actuator (not illustrated) capable of operating the plunger 135 in the up-down direction may be disposed below the second work area E2.

The heater may be similar to a first heater 40 described in the first embodiment. For example, the heater may be installed on the top plate 113 or the turntable 131.

The extruding machine 150 can include a member extending in the up-down direction. The extruding machine 150 may include a barrel 151 in which the resin composition P is conveyed, and a screw 152 that is disposed in the barrel 151 and conveys the resin composition P (specifically, a powdery resin composition P1) supplied into the barrel 151 downward while kneading the resin composition P.

The barrel 151 can include a cylindrical member extending in the up-down direction, and may constitute a conveyance path of the resin composition P. A supply port 153 to which the powdery resin composition P1 is supplied may be formed at an upper end portion of the barrel 151, and a carry-out port 154 may be formed at the other end portion. A resin composition supply path 157 may be connected to the supply port 153. The carry-out port 154 may be provided with, for example, a shutter 156 that opens and closes the carry-out port 154 and also functions as a cutter for cutting the resin composition P. Although not illustrated, a barrel heater for preheating the resin composition P may be disposed inside the barrel 151.

The screw 152 may be a long member rotated by the motor 159 and having a spiral fin formed on an outer peripheral surface. The screw 152 is disposed in the barrel 151 along the extension direction thereof. Only one screw 152 according to the present embodiment may be disposed in the barrel 151, and the screw 152 may be slidable in the up-down direction by a slide mechanism (not illustrated) as described in FIGS. 8A and 8B.

A transfer mechanism 190 for transferring the resin composition P conveyed from the extruding machine 150 into the chamber 130 of the first work area E1 may be provided below the carry-out port 154 of the extruding machine 150. The transfer mechanism 190 may include a transfer mechanism main body 191 that is formed of a long block body, a rotary pillar 192 that rotatably supports an intermediate portion of the transfer mechanism main body 191, an accommodation portion 193 that is formed near both end portions of the transfer mechanism main body 191 in a longitudinal direction and penetrates the transfer mechanism main body 191 in the up-down direction, and a bottom lid 194 that closes a lower end portion of the accommodation portion 193 in an openable and closable manner.

The transfer mechanism 190 having the above-described configuration can receive the resin composition P carried out from the extruding machine 150 into the accommodation portion 193 by causing one accommodation portion 193 to stand by in a state of being positioned below the carry-out port 154 of the extruding machine 150. The resin composition P temporarily accommodated in the accommodation portion 193 may be a paste-shaped resin composition P2 that is pressed against the shutter 156 in the extruding machine 150, pressurized, and then cut into a predetermined size by an opening/closing operation of the shutter 156 to be temporarily molded into a block shape.

When the paste-shaped resin composition P2 is accommodated in one accommodation portion 193, the transfer mechanism main body 191 is rotated to move the accommodation portion 193 accommodating the paste-shaped resin composition P2 onto the chamber 130 in the first work area E1. By opening the bottom lid 194, the paste-shaped resin composition P2 can be put into the chamber 130. Here, when the above-described paste-shaped resin composition P2 is put into the chamber 130, as illustrated in FIG. 9, the other accommodation portion 193 may be positioned below the carry-out port 154 of the extruding machine 150. With such a configuration, the operation of carrying out the paste-shaped resin composition P2 from the extruding machine 150 can be continuously performed.

The motor core manufacturing device 100 according to the present embodiment may be provided with a device main body 110 capable of moving the upper mold 121 in the up-down direction at a position corresponding to the second work area E2. The device main body 110 may include a pillar 112 extending in the up-down direction, a support plate 114 extending in a horizontal direction from an upper end portion of the pillar 112, a top plate 113 vertically movably attached to the support plate 114, and a motor 115 for moving the top plate 113 in the up-down direction.

In the motor core manufacturing device 100 according to the present embodiment, robot arms 181 and 182 for carrying-in and carrying-out of the rotor core 2 may be provided in the vicinity of the first work area E1 and the third work area E3, respectively. The third work area E3 may be provided with a cleaning unit 170 that cleans the lower mold 122 and the like after the rotor core 2 is carried out by the robot arm 182.

The motor core manufacturing device 100 according to the present embodiment may include a control device 160 for controlling the above-described series of components. Similarly to the control device 60 described above, the control device 160 can include a known computer.

When the motor core is manufactured using the motor core manufacturing device 100 according to the present embodiment, the manufacturing can be performed by a process similar to the motor core manufacturing method described in the first embodiment, except that the transfer of the resin composition P and the movement of the rotor core 2 between the work areas are additionally performed. Therefore, detailed description is omitted here.

As described above, the resin molding using the powdery or paste-shaped resin composition P can also be performed by the motor core manufacturing device 100 according to the present embodiment. Since the amount of the resin composition P put into the chamber 130 (in other words, the accommodation portion 193 of the transfer mechanism 190) can be freely adjusted by controlling the device, loss of the resin composition P can be suppressed.

In the present embodiment described above, the case in which the plurality of chambers 130 are provided on the rotating disk-shaped turntable 131 is exemplified, but a linear conveyance path may be adopted instead of the turntable 131. In the present embodiment, the case in which one turntable 131 and one transfer mechanism 190 are provided for one extruding machine 150 is exemplified, but if two turntables 131 and two transfer mechanisms 190 are disposed side by side, and the paste-shaped resin composition P2 carried out from one extruding machine 150 is sequentially transferred by the plurality of transfer mechanisms 190, the motor core can be more efficiently manufactured.

The disclosure is not limited to the above-described embodiments, and various changes can be made without departing from the gist of the disclosure. These are all included in the technical idea of the disclosure. In the disclosure, only one or two or more components may be present as long as there is no contradiction.

All documents including publications, patent applications and patents cited in the present specification are hereby incorporated by reference to the same extent as if each document were individually specifically indicated and incorporated by reference, and all of the contents thereof were set forth herein.

The use of nouns and similar directives used in connection with the description of the disclosure (particularly in connection with the following claims) is to be construed to cover both the singular and the plural, unless otherwise indicated herein or clearly contradicted by context. The phrases “comprising”, “having”, “including”, and “containing” are to be construed as open-ended terms (that is, meaning “including but not limited to”) unless otherwise noted. Recitation of numerical ranges herein are merely intended to serve as shorthand for referring individually to each value falling within the range, unless otherwise indicated herein, and each value is incorporated into the specification as if it were individually recited herein. All methods described herein can be performed in any suitable order unless otherwise indicated herein or clearly contradicted by context. Any example or exemplary language (for example, “such as”) used herein is intended merely to better illustrate the disclosure and does not pose a limitation on the scope of the disclosure, unless otherwise claimed. No language in the specification should be construed as indicating any non-claimed element as essential to the practice of the disclosure.

The preferred embodiments of the disclosure are described herein, including the best mode known to the present inventors for carrying out the disclosure. Variations of these preferred embodiments will be apparent to those skilled in the art upon reading the above description. The inventors expect skilled artisans to apply such variations as appropriate, and expect the disclosure to be practiced otherwise than as specifically described herein. Accordingly, the disclosure includes all modifications and equivalents to the contents of the claims appended hereto as permitted by applicable law. Any combination of the above elements in all variations is encompassed by the disclosure unless otherwise indicated herein or clearly contradicted by context.

What is claimed is:

1. A motor core manufacturing device, comprising:

a mold configured to hold a motor core, the motor core including a resin filling portion;

a chamber configured to communicate with a resin composition filling path, wherein the resin composition filling path is formed in the mold and one end portion of the resin composition filling path is configured to communicate with the resin filling portion;

a plunger configured to convey a resin composition conveyed to the chamber toward the resin composition filling path;

a first heater that is disposed in the mold, or in the mold and around the chamber; and an extruding machine configured to convey the resin composition, while kneading the resin composition, toward the chamber, and put a previously measured amount of the resin composition into the chamber as a paste-shaped resin composition.

2. The motor core manufacturing device according to claim 1, wherein:

the extruding machine includes an extrusion conveyance path configured to convey the resin composition, and a second heater that is disposed around the extrusion conveyance path and configured to heat the resin composition conveyed in the extrusion conveyance path.

3. The motor core manufacturing device according to claim 2, wherein:

the second heater is configured to heat the resin composition conveyed in the extrusion conveyance path to from 70 to 100° C.

4. The motor core manufacturing device according to claim 1, wherein:

the extruding machine includes a screw that is disposed in an extrusion conveyance path that conveys the resin composition, and the screw is configured to convey the resin composition while kneading the resin composition.

5. The motor core manufacturing device according to claim 1, wherein:

the mold includes an upper mold that supports an upper portion of the motor core and a lower mold that supports a lower portion of the motor core, and the lower mold includes a plurality of stages on which the resin composition filling path is formed and a transfer unit that disposes one of the plurality of stages at a position facing the upper mold.

6. A motor core manufacturing method, comprising:

measuring a filling amount of a resin composition that is filled into a resin filling portion of a motor core;

holding the motor core in a mold in which a resin composition filling path is formed, such that the resin composition filling path and the resin filling portion communicate with each other;

conveying the measured filling amount of the resin composition, as a paste-shaped resin composition, toward a chamber that communicates with the resin composition filling path, by using an extruding machine capable of conveying the resin composition;

operating a plunger movable in the chamber to fill the resin filling portion with resin composition softened in the chamber; and hardening the softened resin composition filled into the resin filling portion.

7. The motor core manufacturing method according to claim 6, wherein:

the motor core includes a rotor core, and the resin filling portion includes one or a plurality of slot portions, formed along an axial direction of the rotor core, into which a permanent magnet is insertable, and the motor core manufacturing method further comprises inserting the permanent magnet into the slot portion of the rotor core.

8. The motor core manufacturing method according to claim 6, further comprising:

heating the resin composition conveyed in the extruding machine.

9. The motor core manufacturing method according to claim 6, further comprising:

preheating at least one of the mold or the motor core.

* * * * *